United States Patent
Bishop et al.

(10) Patent No.: US 6,377,782 B1
(45) Date of Patent: Apr. 23, 2002

(54) METHOD AND APPARATUS FOR COMMUNICATING BETWEEN A CLIENT DEVICE AND A LINEAR BROADBAND NETWORK

(75) Inventors: Donald M. Bishop, Beaverton, OR (US); George R. J. Green; Archie R. Shyu, both of San Diego, CA (US)

(73) Assignee: MediaCell, Inc., Highlands Ranch, CO (US)

( * ) Notice: Subject to any disclaimer, the term of this patent is extended or adjusted under 35 U.S.C. 154(b) by 0 days.

(21) Appl. No.: 09/505,107

(22) Filed: Feb. 15, 2000

Related U.S. Application Data
(60) Provisional application No. 60/122,287, filed on Mar. 1, 1999, provisional application No. 60/128,268, filed on Apr. 8, 1999, and provisional application No. 60/142,082, filed on Jun. 29, 1999.

(51) Int. Cl.[7] .......................... H04H 1/00; H04B 10/12; H04B 7/00
(52) U.S. Cl. .................... 455/3.01; 455/3.05; 379/56.2; 370/277; 370/486; 370/487; 725/110; 725/111; 725/119; 725/123
(58) Field of Search .................... 455/13.01, 13.05, 455/422, 66, 67.3, 501; 725/106, 13.1, 109, 110, 114, 111, 126, 123, 119, 120; 370/346, 391, 277, 482, 486, 487; 379/56.2

(56) References Cited

U.S. PATENT DOCUMENTS

| | | | | | |
|---|---|---|---|---|---|
| 4,135,157 A | * | 1/1979 | den Toonder | ................ | 725/120 |
| 4,479,253 A | * | 10/1984 | Daniel, Jr. | ................ | 455/226.2 |

(List continued on next page.)

FOREIGN PATENT DOCUMENTS

| | | | | |
|---|---|---|---|---|
| EP | 0803 7895 | 2/1996 | ............ | H04Q/7/38 |
| EP | 0 790 749 A2 | 8/1997 | ............ | H04Q/7/32 |
| EP | 0 794 749 A3 | 4/1999 | ............ | H04Q/7/32 |
| JP | 08298688 | 12/1996 | ............ | H04Q/7/38 |
| WO | WO 94/15294 | * 7/1994 | .................... | 705/1 |
| WO | WO 97/48191 | * 12/1997 | ................ | 455/403 |
| WO | WO 98/15143 | * 4/1998 | ................ | 455/553 |
| WO | WO 98/39879 | * 9/1998 | ................ | 370/352 |

OTHER PUBLICATIONS

"Technology, Customer Service Hand-in-Hand at Road Runner", *Communication Technology*, May 1999, by Whalen, pp. 42 & 44.

(List continued on next page.)

*Primary Examiner*—Nay Maung
*Assistant Examiner*—Raymond B. Persino
(74) *Attorney, Agent, or Firm*—William W. Cochran

(57) ABSTRACT

A method of upstream communication over a linear broadband network includes the steps of generating an upstream baseband signal and modulating it onto an upstream wireless radio frequency carrier to produce a first upstream modulated carrier signal. The modulated carrier signal is transmitted wirelessly, received, and demodulated to reproduce the information integrity of the upstream baseband signal. The signal is then modulated onto an upstream linear broadband radio frequency carrier for transmission on the linear broadband network. Advantageously, noise that accumulates at the subscriber premises is removed from the upstream signal prior to presentation of the signal to the upstream path of the linear broadband network. A system for communicating over a linear broadband network includes network access interface devices coupled to the linear broadband network. A subscriber access interface device accepts upstream communication signals and modulates and transmits the signal to the network access interface device. The network access interface device 6 receives and demodulates the signal and then modulates it for transmission on the linear broadband network.

129 Claims, 11 Drawing Sheets

U.S. PATENT DOCUMENTS

| | | | |
|---|---|---|---|
| 5,142,532 A | | 8/1992 | Adams ..................... 370/94.1 |
| 5,272,700 A | | 12/1993 | Hansen et al. ............. 370/85.3 |
| 5,373,503 A | | 12/1994 | Chen ........................... 370/18 |
| 5,421,030 A | * | 5/1995 | Baran ......................... 725/106 |
| 5,463,656 A | * | 10/1995 | Polivka et al. .............. 375/130 |
| 5,610,916 A | * | 3/1997 | Kostreski et al. ........... 370/487 |
| 5,708,961 A | | 1/1998 | Hylton ....................... 455/4.2 |
| 5,751,707 A | | 5/1998 | Voit et al. .................... 370/384 |
| 5,790,806 A | | 8/1998 | Koperda ................ 795/200.82 |
| 5,793,413 A | | 8/1998 | Hylton et al. ................. 348/12 |
| 5,815,793 A | | 9/1998 | Ferguson .................... 455/3.1 |
| 5,815,794 A | | 9/1998 | Williams .................... 455/5.1 |
| 5,825,776 A | * | 10/1998 | Moon ......................... 370/437 |
| 5,828,946 A | | 10/1998 | Feisullin et al. ............. 455/5.1 |
| 5,835,128 A | | 11/1998 | Macdonald et al. ........... 348/8 |
| 5,839,052 A | | 11/1998 | Dean et al. .................. 455/5.1 |
| 5,844,594 A | | 12/1998 | Ferguson ..................... 348/10 |
| 5,867,485 A | | 2/1999 | Chambers et al. |
| 5,867,763 A | | 2/1999 | Dean et al. .................. 455/5.1 |
| 5,870,134 A | * | 2/1999 | Laubach et al. ............ 725/123 |
| 5,896,382 A | | 4/1999 | Davis et al. ................. 370/401 |
| 5,951,709 A | | 9/1999 | Tanaka ........................ 714/755 |
| 6,032,261 A | * | 2/2000 | Hulyalkar ................... 713/400 |
| 6,205,495 B1 | * | 3/2001 | Gilbert et al. .............. 455/557 |

OTHER PUBLICATIONS

"The Internet via Cable", *Scientific American*, Oct. 1999, by Medin and Rolls, pp. 100 & 101.

"intersil Prism1Kit–Eval DSSS PC Card Wireless LAN Description", *Application Note AN9624.6*, Aug. 1999, by Andren, Paljug and Schultz, pp. 1–21.

"Breezecom IEEE 802.11Technical Tutorial", *Wireless Communications*, undated Breeze Wireless Communications,Ltd., pp. 1–18.

"A Short Tutorial on Wireless LANs and IEEE 802.11", *The Bradley Department of Electrical and Computer Engineering*, Virginia Polytechnic Institute and State University, Oct. 1999, by Lough, Blankenship, Krizman, pp. 1–4.

* cited by examiner

METHOD AND APPARATUS FOR COMMUNICATING BETWEEN A CLIENT DEVICE AND A LINEAR BROADBAND NETWORK

Cross Reference to Related Applications

This application claims the benefit of provisional application Ser. No. 60/122,287, filed Mar. 1, 1999, entitled "BI-DIRECTIONAL COMMUNICATION SYSTEM USING WIRELESS MEANS SUCH AS IEEE 802.11 TO ELIMINATE NOISE NORMALLY ASSOCIATED WITH A CABLE SUBSCRIBER DROP," provisional application Ser. No. 60/128,268 filed Apr. 08, 1999, entitled "BI-DIRECTIONAL COMMUNICATION SYSTEM USING WIRELESS MEANS SUCH AS IEEE 802.11 TO ELIMINATE NOISE NORMALLY ASSOCIATED WITH A CABLE SUBSCRIBER DROP" and provisional application Ser. No. 60/142,082, filed Jun. 29, 1999, entitled "BI-DIRECTIONAL COMMUNICATION SYSTEM USING WIRELESS MEANS SUCH AS IEEE 802.11 TO ELIMINATE NOISE NORMALLY ASSOCIATED WITH A CABLE SUBSCRIBER DROP."

FIELD OF THE INVENTION

The present invention relates generally to data communications and more specifically to transmission and receipt of data via a linear broadband network.

BACKGROUND OF THE INVENTION

There currently exists a complex and robust wired television cable infrastructure that is commonly referred to as the Hybrid Fiber Coax ("HFC") network. The HFC network is an example of a linear broadband network having substantially linear and broadband frequency characteristics. A linear broadband network exhibits linearity in that there are substantially no exponential terms in a gain function of the network over a frequency band of operation. As one of ordinary skill in the art appreciates, an all fiber and an all coaxial cable network is also a linear broadband network. The HFC network merely happens to be the most prevalent linear broadband network in use at the time of the filing of the present patent application. The HFC network has typically been used for delivery of television signals to subscribers. Each subscriber, which represents either an individual or a business, is connected to the cable TV HFC network through coaxial cables running from a headend in a trunk and branch configuration to individual subscribers. Over time, the cable TV HFC network has been upgraded by replacement of some of the coaxial cable trunk lines with fiber optic cable, which has led to this infrastructure being referred to as the HFC network. The connection between the HFC network and the subscriber premises is conventionally made with a coaxial cable, referred to as a subscriber drop, which spans the connection between a tap connected to the HFC network and a client device, which is most cases is a television set, located in the subscriber premises.

Deregulation of the communications industry has made it permissible for the telephony companies to supply television and video services and cable companies to supply telephony and data services. Accordingly, there is an interest among the cable TV service providers to grow their market share by being able to offer all communications services. The cable TV service providers are in a unique position in that they already have a linear and broadband network that reaches many existing subscribers. Their main historical business being television delivery, the cable companies have focused primarily on the forward or downstream path. In order to be a full service provider, however, the return or upstream path from the subscriber to the headend must be provided. For example, there is a growing demand for communication services that require higher performance from the communication infrastructure, such as higher speed Internet access, interactive television, video conferencing, and telephony. As the demand grows, there will be increasing demands placed on the quality and speed of the downstream and upstream paths. Providing subscriber access to the upstream path presents a challenge to the cable TV service providers. The cable TV service providers have provided a high quality network up to the curb (tap). However, the subscriber drop and client devices have been a source of significant noise resulting from bad connectors, unterminated connections, frayed cables, faulty wiring, breached shielding, noise generated by subscriber appliances, etc. The noise leaks into subscriber wiring and onto the subscriber drop, presenting itself on the upstream path of the HFC network as unwanted signal energy. The very nature of the trunk and branch configuration of the hybrid fiber coax network causes the noise to accumulate on the upstream path as the branches of the network converge. The noise from each subscriber adds together to reduce the overall signal-to-noise ratio of the return signal.

The signal-to-noise ratio of a communications signal is directly related to the effective bandwidth of the channel. Decreasing the signal-to-noise ratio, therefore, increases the bit error rate of a channel. As signal-to-noise ratio decreases, the data transmission rate must slow to a level that provides a sufficiently low bit error rate. The lowering of the data transmission rate is in direct contravention to the objective of the cable TV service providers in supplying high-speed communication services. The signal-to-noise ratio problem is exacerbated when the composite signal reaches an optical laser that is used to power the return transmission fiber. The absolute power level of the signal is limited because the laser has a fixed modulation index. In other words, as the noise level increases, the available signal strength decreases. This limits the cable service provider's option of amplifying the signal to achieve an acceptable signal-to-noise ratio. In data transmission applications, it is possible to employ loss packet retransmission to correct for noise that degrades the integrity of the upstream information. As speeds increase, however, retransmission consumes valuable bandwidth that would otherwise be used for additional upstream information. Consequently, noise limits the overall capacity of the network, thereby increasing the cost of the service to subscribers. There is a need, therefore, to improve upstream capacity on the network by reducing the injection of upstream noise.

U.S. Pat. No. 5,867,485 issued to Chambers et al. and assigned to Bellsouth Corporation, proposes a low power microcellular wireless drop for a full duplex interactive network in which a cable connecting a bi-directional fiber network to a subscriber premises is replaced by two wireless transceivers. A Network Interface Unit multiplexes and de-multiplexes signals transmitted and received from a number of subscriber appliances. These signals are transmitted and received by a roof or eaves mounted antenna. The upstream signal is up-converted, amplified, and filtered before being transmitted to a receiver. The system disclosed is a linear processing system, which amplifies the noise presented to the upstream path by the subscriber premises. Disadvantageously, the linear processing propagates any in-band noise and reduces the signal-to-noise ratio. The downstream signal is filtered, amplified, and downconverted before entering the Network Interface Unit and de-multiplexed to the appropriate appliance. The wireless drop succeeds in isolating the subscriber premises from the bi-directional fiber network, but does not remove the noise injected into the upstream signal. There remains a need, therefore, for a method or system to limit the noise ingress into the upstream path.

SUMMARY OF THE INVENTION

According to one aspect of an embodiment of the present invention, a method of communicating information from a client device to a linear broadband network having substantially linear and broadband frequency characteristics comprises the steps of generating an upstream baseband signal having a predefined format. The method further comprises modulating the upstream baseband signal onto at least one upstream wireless radio frequency carrier to generate at least one first upstream modulated carrier signal and transmitting the at least one first upstream modulated carrier signal wirelessly. The method further includes receiving the at least one first upstream modulated carrier signal at a network access interface device coupled to the linear broadband network and demodulating the at least one first upstream modulated carrier signal to produce an upstream demodulated baseband signal. The method then comprises modulating the upstream demodulated baseband signal onto at least one upstream linear broadband radio frequency carrier to produce at least one second upstream modulated carrier signal having a signal format compatible with the linear broadband network.

According to another aspect of the present invention, a method of communicating bi-directional information between a client device and a linear broadband network having substantially linear and broadband frequency characteristics comprises the steps of generating an upstream baseband signal, having a predefined format, and modulating the upstream baseband signal onto at least one upstream wireless radio frequency carrier to generate at least one first upstream modulated carrier signal. The method further comprises transmitting said at least one fist upstream modulated carrier signal wirelessly and receiving said at least one first upstream modulated carrier signal at a network access interface device coupled to the linear broadband network. The method further comprises demodulating the at least one first upstream modulated carrier signal to produce an upstream demodulated baseband signal and modulating the upstream demodulated baseband signal onto at least one upstream radio linear broadband frequency carrier to produce at least one second upstream modulated carrier signal having a signal format compatible with the linear broadband network. The method further comprises receiving at least one downstream linear broadband network radio frequency carrier signal comprising a first downstream modulated carrier signal from the linear broadband network and demodulating the at least one first downstream modulated carrier signal to produce at least one first downstream baseband signal having a predefined format. The method further comprises modulating the at least one first downstream baseband signal onto at least one downstream wireless radio frequency carrier to generate at least one second modulated downstream carrier signal and transmitting said at least one second modulated downstream carrier signal wirelessly. The method further comprises receiving the at least one second modulated downstream carrier signal and demodulating the at least one second modulated downstream carrier signal to produce at least one second downstream baseband signal. The method further comprises transmitting the at least one second downstream baseband signal.

According to another embodiment of a system for upstream communication, the system comprises a linear broadband network having substantially linear and broadband frequency characteristics, a first upstream modulator that modulates at least one upstream baseband signal received from a client device, the at least one upstream baseband signal being modulated onto at least one upstream wireless radio frequency carrier to produce a first upstream modulated carrier signal. The system further comprises an upstream transmitter that wirelessly transmits the at least one first upstream modulated carrier signal, an upstream receiver that receives the at least one first upstream modulated carrier signal, and an upstream demodulator that demodulates the at least one first upstream modulated carrier signal to generate at least one upstream demodulated baseband signal. The system further comprises, a second upstream modulator that modulates the at least one demodulated upstream baseband signal onto at least one upstream linear broadband network radio frequency carrier for transmission onto the linear broadband network.

According to another embodiment of the present invention a system is provided for bi-directional communication that comprises a bi-directional linear broadband network having substantially linear and broadband frequency characteristics, a first upstream modulator that modulates at least one upstream baseband signal received from a client device, the at least one upstream baseband signal being modulated onto at least one upstream wireless radio frequency carrier to produce at least one first upstream modulated carrier signal, and an upstream transmitter that wirelessly transmits the at least one first upstream modulated carrier signal to an upstream receiver. The upstream receiver receives the at least one first upstream modulated carrier signal. The system further comprises an upstream demodulator that demodulates the at least one first upstream modulated carrier signal to generate at least one upstream demodulated baseband signal. The system further comprises a second upstream modulator that modulates the at least one demodulated upstream baseband signal onto at least one upstream linear broadband network radio frequency carrier for transmission onto the linear broadband network. The bi-directional system further comprises a first downstream receiver that receives at least one first downstream modulated carrier signal from the linear broadband network, a first downstream demodulator that demodulates the at least one first downstream modulated carrier signal to produce a first downstream baseband signal, and a downstream modulator that modulates the first downstream baseband signal onto a downstream wireless radio frequency carrier to produce a second downstream modulated carrier signal. The system further comprises a downstream transmitter that transmits the downstream modulated carrier signal, a second downstream receiver that receives the downstream modulated carrier signal, and a second downstream demodulator that demodulates the downstream modulated carrier signal to produce a second downstream baseband signal for delivery to the client device.

In another embodiment according to the teachings of the present invention, an apparatus for coupling to a linear broadband network is provided that comprises an upstream receiver that wirelessly receives at least one first upstream modulated carrier signal, an upstream demodulator that demodulates the at least one upstream modulated carrier signal to produce at least one demodulated upstream baseband signal, an upstream modulator that modulates the at least one demodulated upstream baseband signal onto at least one upstream linear broadband network radio frequency carrier to produce at least one second upstream modulated carrier signal for transmission on the linear broadband network, and an upstream transmitter that transmits the at least one second upstream modulated carrier signal onto the linear broadband network.

In another embodiment according to the teachings of the present invention, an apparatus is provided for communicating with a linear broadband network having substantially linear and broadband frequency characteristics comprises an upstream receiver for receiving a plurality of upstream baseband signals over a wired connection from a plurality of client devices, a multiplexer for multiplexing the plurality of upstream baseband signals onto a multiplexed upstream baseband signal, a first upstream modulator for modulating the at least one multiplexed upstream baseband signal onto at least one upstream wireless radio frequency carrier, and an upstream transmitter for transmitting the at least one upstream wireless radio frequency wireless carrier.

In another embodiment according to the teachings of the present invention, a system is provided for upstream communication over a linear broadband network having substantially linear and broadband frequency characteristics, comprises a subscriber access interface device that receives an upstream baseband signal from a client device, modulates said upstream baseband signal onto at least one upstream wireless radio frequency carrier to produce at least one first upstream modulated carrier signal, and wirelessly transmits the at least one first upstream wireless modulated carrier signal, and a network access interface device, coupled to said linear broadband network, that receives the at least one first upstream modulated carrier signal, demodulates the at least one first upstream modulated carrier signal to produce at least one demodulated upstream baseband signal, modulates the at least one demodulated upstream baseband signal onto at least one upstream linear broadband network radio frequency carrier having a format compatible with the linear broadband network to produce at least one second upstream modulated carrier signal, and transmits the at least one second upstream modulated carrier signal onto the linear broadband network.

In another embodiment according to the teachings of the present invention, a system is provided for upstream communication comprises a linear broadband network having substantially linear and broadband frequency characteristics, a subscriber access interface device that receives an upstream baseband signal from a client device, modulates the upstream baseband signal onto at least one upstream wireless radio frequency carrier to produce at least one first upstream modulated carrier signal, and wirelessly transmits the at least one first upstream wireless modulated carrier signal. The system further comprises a network access interface device, coupled to the linear broadband network, that receives the at least one first upstream modulated carrier signal, demodulates said at least one first upstream modulated carrier signal to produce at least one demodulated upstream baseband signal, modulates said at least one demodulated upstream baseband signal onto at least one upstream linear broadband network radio frequency carrier having a format compatible with the linear broadband network to produce at least one second upstream modulated carrier signal, and transmits the at least one second upstream modulated carrier signal onto the linear broadband network.

In a system employing a method according to the teachings of the present invention, noise that accumulates at the subscriber premises is removed from the upstream signal prior to presentation of the signal to the upstream path of the linear broadband network. Because the upstream signal generated is a digital signal or an analog signal that has been converted to a digital signal, when the carrier is demodulated, the system is able to reconstruct the signal into an image of the transmitted digital signal without the noise, thereby restoring the information integrity of the original signal. The inherent bandwidth limiting function and hysterisis of a digital signal filters out and removes much of the noise, as the signal is prepared for transmission. A baseband signal directly modulates a wireless carrier using modulation techniques that minimize noise interference of the transmitted signal. The reconstruction process further filters out noise that is injected into the system because of the transmission process. Advantageously, this elimination of noise is cumulative and provides for a significantly quieter upstream path composite signal.

Use of a digital baseband signal for the entire distance up to wireless transmission greatly reduces the introduction of noise and permits use of error checking and retransmission, forward error correction, error concealment, or a combination thereof in the link between the subscriber premises and the network access interface device. Similar use of error checking and retransmission, forward error correction, and error concealment may also be used for the link between the network access interface device and the headend. The additional error management step advantageously reduces the number of errors that must be addressed allowing faster data transmission rates and more efficient use of bandwidth as compared to conventional systems.

As pointed out above, the linear broadband network communications infrastructure may comprise the hybrid fiber coaxial ("HFC") network conventionally used for delivery of cable TV services. The HFC network currently uses a wired tap technology. The wired tap technology comprises a drop cable extending from a tap at a curb to equipment located at a subscriber premises. The wireless tap, or network access interface device according to the teachings of the present invention, is compatible with and is able to coexist on the same network as the wired tap. Accordingly, the network access interface device of the present invention provides a smooth and gradual upgrade installation path for communication service providers. Services to existing subscribers need not be disturbed when subscribers are added or upgraded. Each network access interface device supports a plurality of subscribers. Accordingly, the total number of two-way transceivers connected to the linear broadband network is reduced. By concentrating the services supported by a single modem, there is a decrease in the number of noise sources connected to the linear broadband network. The signal-to-noise ratio, therefore, is improved by 10 log the a ratio of the number of network access interface devices over the number of wired modems that a conventional system would require for the same level of service.

DETAILED DESCRIPTION OF EMBODIMENTS OF THE INVENTION

Figure 1:
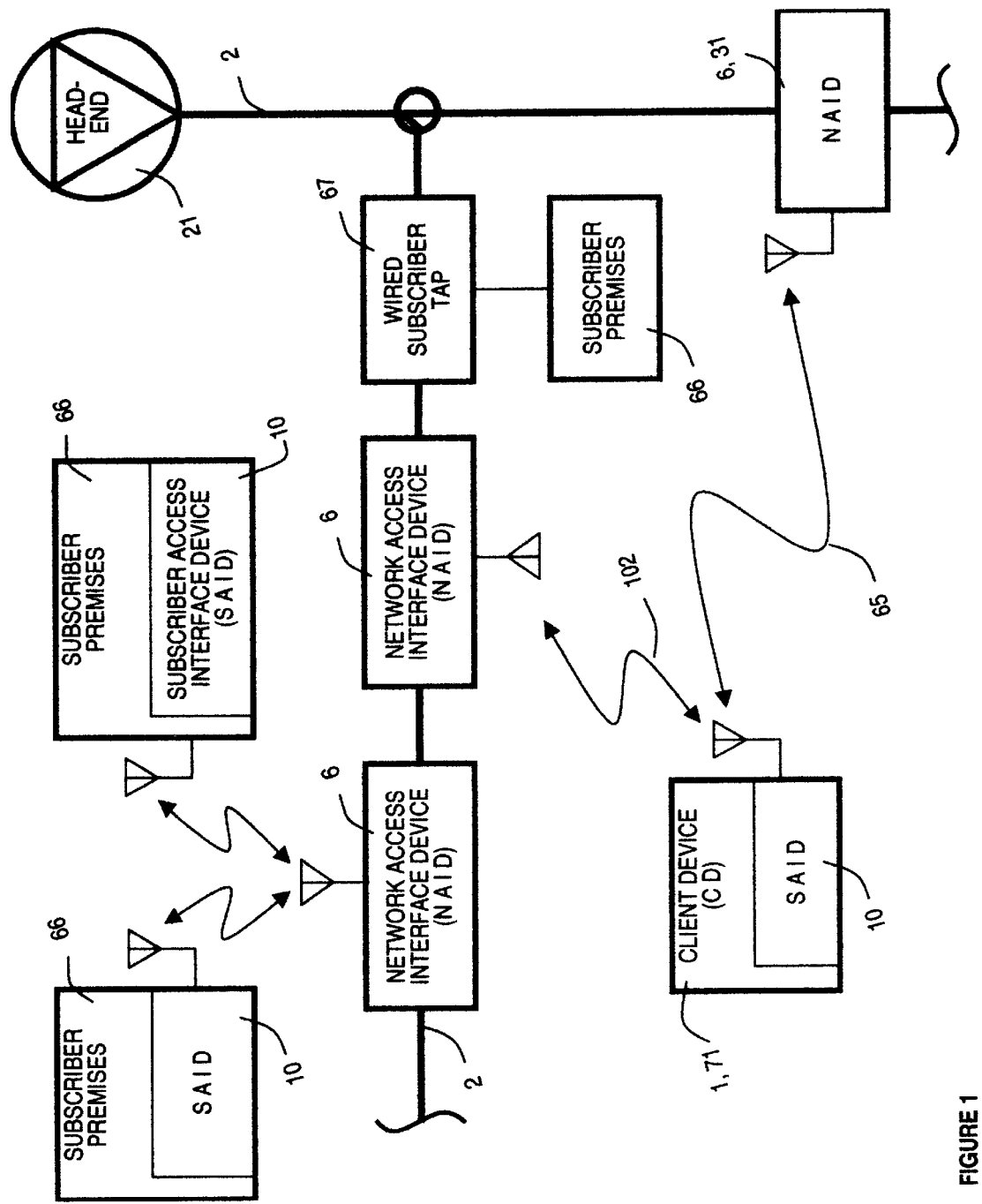
FIG. 1 is a representative view of an embodiment of system according to the teachings of the present invention.
Figure 2:
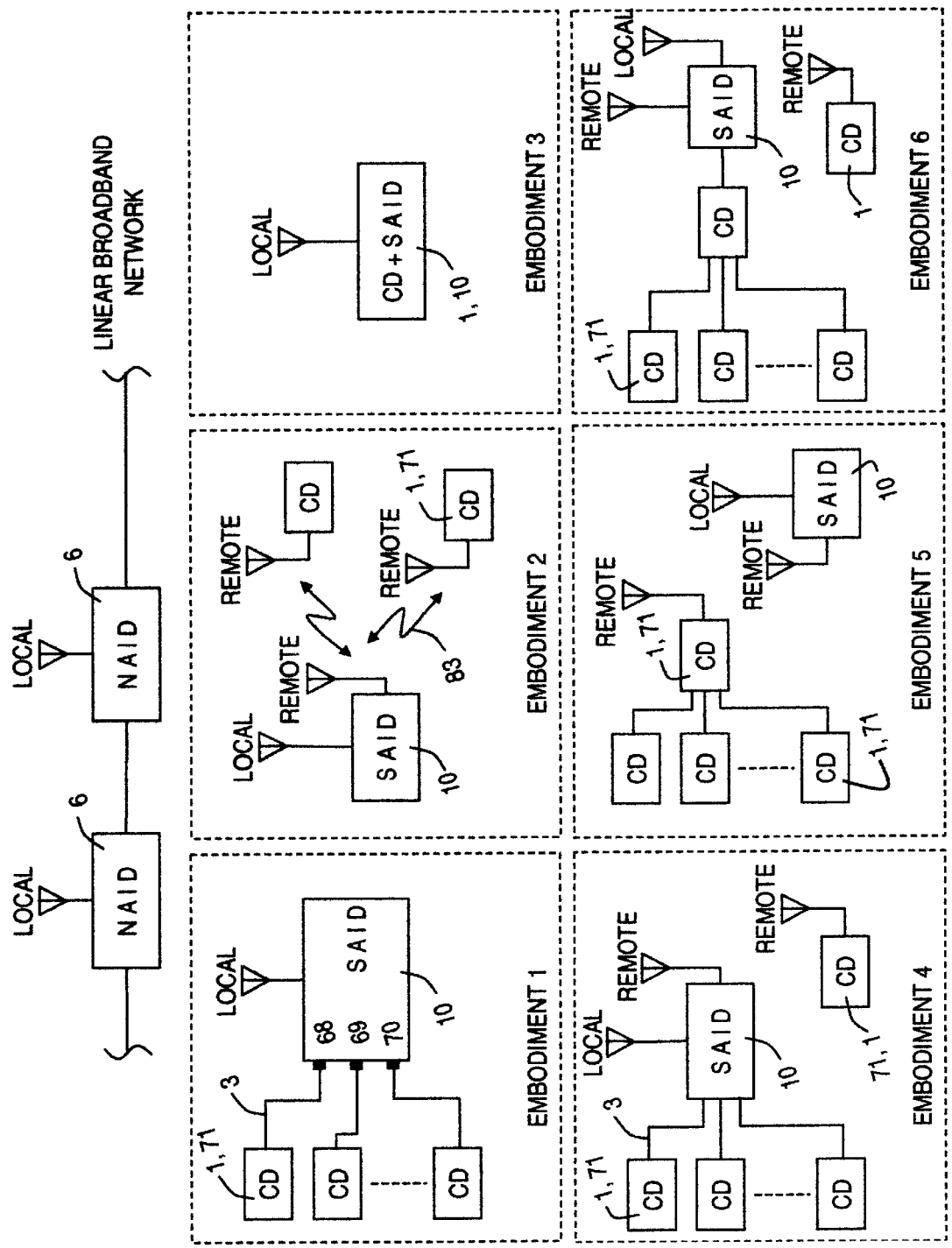
FIG. 2 is a representative view of a network access interface device and various possible embodiments of subscriber access interface devices and client devices employed in a method according to the teachings of the present invention. The possible embodiments shown are not exhaustive. Other embodiments will occur to one of ordinary skill in the art having benefit of the present disclosure.

With specific reference to FIGS. 1 and 2 of the drawings, there is shown a system according to the teachings of the present invention in which a subscriber access interface device 10 ("SAID") communicates bi-directionally with a network access interface device 6 ("NAID") coupled to a linear broadband network 2. The NAID 6 is an integrated gateway that contains both a Wide Area Network ("WAN") connection and a wireless Local Area Network ("LAN") connection. For purposes of discussion, an example of the WAN is the linear broadband network 2, such as the existing HFC network, and an example of the LAN is a communication network at a subscriber premises 66. The WAN connection in the NAID 6 provides all of the functionality of a cable modem. In a preferred embodiment, the cable modem portion of the NAID 6 is DOCSIS compliant and provides DOCSIS functionality including, but not limited to, automatic negotiation, registration, encryption, and automatic assignment of IP addresses. There is a plurality of the NAIDs 6 on the linear broadband network 2. The SAID 10 communicates with one of the NAIDs 6 and provides the LAN connectivity at the subscriber premises 66 or directly at a client device. In a preferred embodiment, the subscriber access interface device 10 and the network access interface device 6 use half-duplex communications, however, full-duplex communications are also appropriate depending upon a specific application. The network access interface device 6 receives downstream information from a headend 21 and wirelessly relays the downstream information to the appropriate subscriber access interface device 10. The subscriber access interface device 10 further distributes the downstream information to an appropriate destination client device 71. Similarly, the subscriber access interface device 10 receives upstream information from an initiating client device 1 and wirelessly relays it to the network access interface device 6. The network access interface device 6 either distributes the information to another subscriber access interface device 10 supported by the same network access interface device 6 or further relays the upstream information to the headend 21 via the linear broadband network 2. The destination client device 71 is a uni-directional or bi-directional communication device and may be, for example, a telephone, a video device, a computer, or an audio device. As one of ordinary skill in the art appreciates, therefore, the initiating and destination client devices 1, 71 may be and are typically the same device. In terms of their logical processing, however, they perform separate functions and are therefore discussed separately. The network access interface device 6 that services the subscriber access interface device 10 is that network access interface device 6 that has the "best" connection to the subscriber access interface device 6 that is being serviced. Upon occasion, however, a transient obstruction will cause a degradation of a primary communications link 102 between the subscriber access interface device 10 and the network access interface device 6. When the primary communications link 102 degrades to a predetermined threshold, the subscriber access interface device 10 searches for an alternate communications link 65 to establish with an alternate network access interface device 31.

The subscriber access interface device 10 as disclosed in the present patent application can take many forms, which will be described. Because there are so many possible variations of subscriber access interface device 10 to destination client device 71 and initiating client device 1 to network access interface device 6 embodiments, the specific embodiments described are for illustrative purposes only and do not represent all possible combinations.

The network access interface device 6 as disclosed in the present patent application is for coupling to the existing linear broadband network 2 infrastructure. An example of the linear broadband network 2 is a conventional hybrid fiber coaxial network ("HFC network") currently employed by the cable television industry for servicing its subscribers with downstream cable television. Advantageously, the network access interface device 6 is able to co-exist on the same infrastructure as a conventional wired subscriber tap 67 currently used for conventional signal distribution to a subscriber premises 66. Other examples of the linear broadband network 2 include a fiber network and a coaxial cable network that are able to reach a number of subscribers. The network access interface device 6, coupled to the linear broadband network 2, services up to sixteen subscriber premises 66 and 256 client devices 1, 71 within an approximately 300 meter radius. As a practical matter, the density of subscriber access interface devices 10 may dictate that the actual radius of coverage be more or less than 300 meters and may vary for each subscriber access interface device 10 in the system. The actual number of subscriber premises 66 and client devices 1,71 each network access interface device 6 is able to service depends upon a number of factors such as an addressing design of the network access interface device 6, a distance of the subscriber premises 66 from the network access interface device 6, a number of client devices 1, 71 within the subscriber premises 66, the bandwidth of wireless channels utilized by the network access interface device 6, transmission power levels, and other factors that will occur to one of ordinary skill in the art. In one embodiment of the system according to the teachings of the present invention, the subscriber access interface device 10 may be located at the subscriber premises 66. In this embodiment, the subscriber premises 66 may be a home or a business that requires connectivity to the linear broadband network 2. The subscriber access interface device 10 can provide a minimum of the same service available using the conventional wired tap 67. A cable service provider, therefore, is able to upgrade the capability of all of its subscribers without compromising the basic service to which the subscriber had become accustomed. Additionally, the system according to the teachings of the present invention permits multiple uni-directional and bi-directional client devices 1,71 to be connected to the linear broadband network 2 via the subscriber access interface unit 10 and also permits a client device 1,71 to establish or maintain connectivity with the linear broadband network 2 while roaming. The term "roaming" is used to describe having connectivity with the communications infrastructure while moving and without requiring physical location within the subscriber premises 66. Accordingly, a system according to the teachings of the present invention provides the minimum cable TV distribution capability while also providing other wireless communications capability on the same linear broadband network 2.

With specific reference to FIG. 2 of the drawings, there is shown various possible configurations of client device 1,71 to subscriber access interface device 10. In a first embodiment a plurality of the client devices 1 are connected to the subscriber access interface device 10 via a wired connection. In this embodiment, the subscriber access interface device 10 is a peripheral device and typically has the appearance, in cable TV parlance, of a "set top box". With additional reference to FIG. 3 of the drawings, the subscriber access interface device 10 receives a plurality of upstream baseband signals 3 or a plurality of upstream information signals 11. The upstream information signals 11 are converted to the upstream baseband signal 3 format either in the initiating client device 1 or in the subscriber access interface device 10. With additional reference to FIG. 4 of the drawings, the upstream baseband signal 3 format comprises a plurality of upstream data packets 24 having an address header 25. The address header 25 indicates the destination client device 71 for the upstream data packet 24 in a dotted quad IP format.

In a second embodiment of a subscriber access interface device 10 according to the teachings of the present invention, a plurality of the client devices 1 are connected to the subscriber access interface device 10 via a wireless connection. The client devices 1 modulate the upstream baseband signal 3 onto remote upstream wireless carriers to produce remote upstream modulated carriers 83. It is preferred that the remote connection between the client devices 1 and the subscriber access interface device 10 in a wireless communication embodiment follow the Home RF or Bluetooth communication protocols, but the IEEE 802.11 protocol is also an option. The remote upstream modulated carrier 83 is demodulated to reproduce the upstream data packets 24.

In a third embodiment according to the teachings of the present invention, the subscriber access interface device 10 is unitary with the client device 1. As one of ordinary skill in the art appreciates, the upstream baseband signal 3 is wired directly from the electronics in the client device 1 to the transmission electronics in the subscriber access interface device 10. The client device 1, therefore, is free to roam and communicates with whichever one of the network access interface devices 6 is local to it.

Fourth, fifth, and sixth embodiments according to the teachings of the present invention illustrate combinations of the wired and wireless connections between the client devices 1 and the subscriber access interface device 10. Embodiments five and six illustrate that the client device 1 may be a hub or router type of device with either a wired or a wireless connection. In addition the hub or router type of device may further support and be combined with other client devices 1.

Embodiments one through six as shown on FIG. 2 of the drawings are intended to be illustrative and not exhaustive. Other combinations will occur to those of ordinary skill in the art and are within the scope of the present invention.

Figure 3:
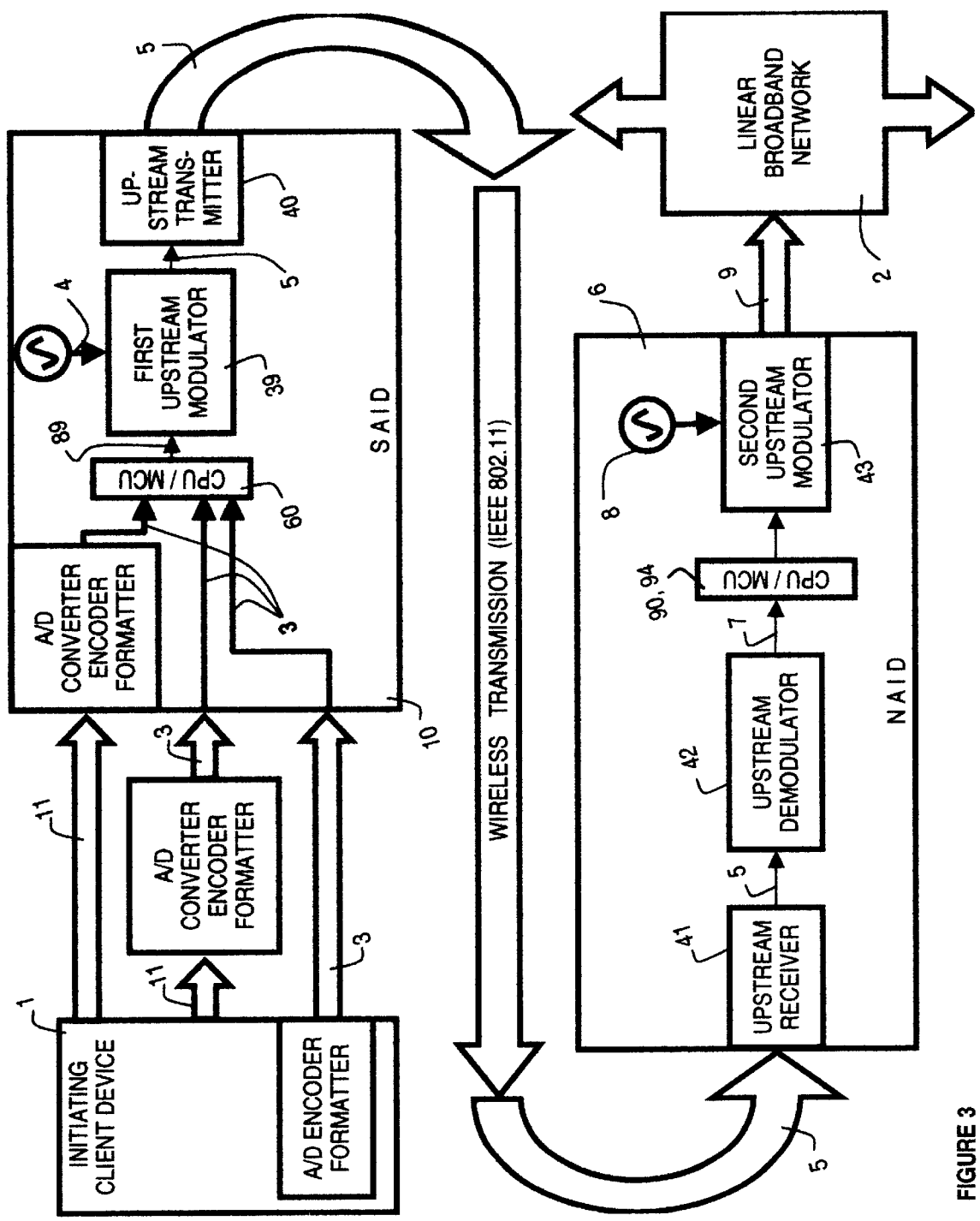
FIG. 3 is a representative view of an upstream signal flow according to the teachings of the present invention from an initiating client device to a linear broadband network.
Figure 4:
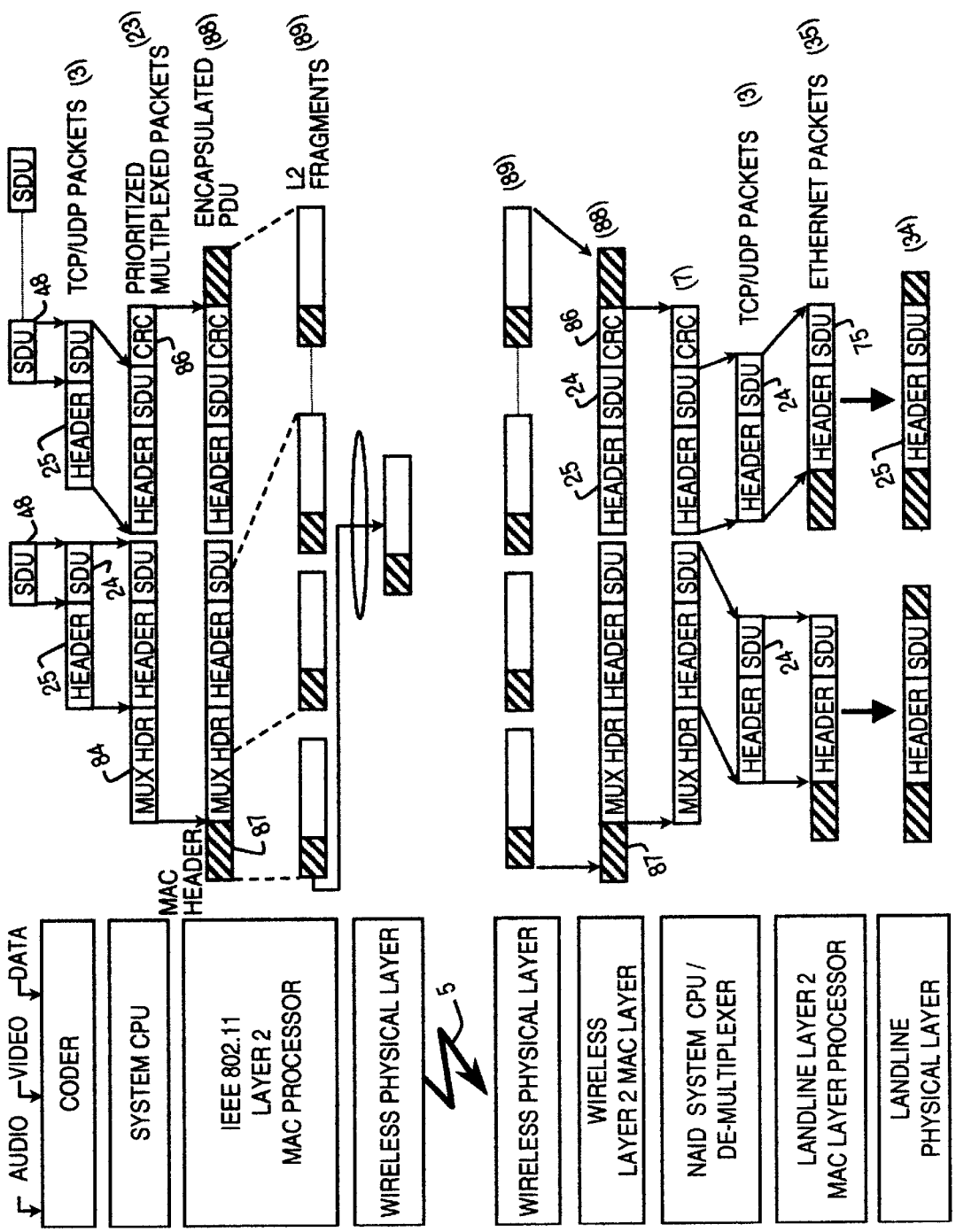
FIG. 4 is a representative diagram of data packets at various stages of an upstream data transmission process.

To establish upstream connectivity according to the teachings of the present invention and with reference to FIGS. 3 and 4 of the drawings, the initiating client device 1 generates an upstream information signal 11. The upstream information signal 11 is converted into an upstream baseband signal 3 having an Internet protocol ("IP") format using a dotted quad addressing protocol in the address header 25 followed by the upstream information data. It is not necessary that the client device 1 directly generate the upstream baseband signal 3. As represented in FIG. 3 by three alternative paths for the upstream information signal 11 generated by the initiating client device 1, either the initiating client device 1, the subscriber access interface device 10, or a separate formatting device may digitize, convert, and format the upstream information into the upstream baseband signal 3.

An analog initiating client device 1, such as a legacy telephone, generates an upstream analog signal 11, such as a POTS signal. In order to convert the upstream analog signal 11 to the upstream baseband signal 3, the upstream analog signal 11 is digitized to produce a corresponding upstream digital signal. The upstream digital signal is then encoded and formatted into the upstream baseband signal 3. Alternatively, the digitizing, encoding, and formatting operations may occur within the subscriber access interface device 10, in which case the subscriber access interface device 10 receives the upstream analog signal 11 directly. The digitizing, encoding, and formatting operations may also occur in a peripheral device, which outputs the upstream baseband signal 3 for transmission to the subscriber access interface device 10. The digitizing, encoding, and formatting operations may occur within the initiating client device 1, in which case, the initiating client device 1 outputs the upstream baseband signal 3 directly to the subscriber access interface device 10. Other variations for providing the upstream baseband signal 3 to the subscriber access interface device 10 are possible and are within the scope of the present invention.

The connection from the initiating client device 1 to the subscriber access interface device 10 may be a wired connection or a wireless connection. In the case of a wireless connection between the initiating client device 1 and the subscriber access interface device 10, known communication protocols such as Home RF, Bluetooth, or IEEE 802.11 are appropriate. Specifications of the Home RF and Bluetooth communication protocols are hereby incorporated by reference. Accordingly, prior to further processing, the upstream information signal 11 is converted into the upstream baseband signal 3 having the IP format. The upstream baseband signal 3 comprises a series of upstream data packets 24. Each upstream data packet 24 comprises a service data unit ("SDU") 48 containing upstream information to be sent to the destination client device 71 with an address header 25 in a Transmission Control Protocol/User Data Protocol ("TCP/UDP") format. The address header 25 contains one or more destination addresses, the type of data in the SDU 48 (i.e. voice, video, or data), and the total number of bytes that make up the SDU 48. As one of ordinary skill in the art appreciates, the address header 25 contains the information necessary to route the upstream data packet 24 to the appropriate destination client device 71 in the same way connectivity is established on the Internet.

As shown in FIG. 2 of the drawings, the subscriber access interface device 10 is able to accept simultaneous inputs from multiple ones of the client devices 1. The subscriber access interface device 10 time domain multiplexes the upstream data packets 24, to produce a multiplexed upstream baseband signal 23. As part of the multiplexing process, the subscriber access interface device 10 may assign an even priority among all of the upstream data packets 24 or it can perform a prioritization function for each upstream data packet 24. The prioritization process provides quality of service by controlling a latency of each upstream data packet 24. As one of ordinary skill in the art will appreciate, the upstream data packets 24 from a voice or a video communications signal must be reliably and consistently delivered in real time, within the appropriate bandwidth, and cannot tolerate lost packet retransmission. The upstream data packets 24 from a data communications signal, however, may be delivered as packet bursts and are able to tolerate lost packet retransmission. Accordingly, a prioritizing process takes a data packet type into account when determining when the upstream data packet 24 is to be launched onto the multiplexed upstream baseband signal 23.

With specific reference to FIG. 3 of the drawings, a central processing unit ("CPU") 60 in the subscriber access interface device 10 (hereinafter termed a "SAID CPU 60") performs the prioritization and multiplexing operations. A dedicated multiplexer performing the same functions is also appropriate. The SAID CPU 60 receives a plurality of the upstream data packets 24 and can assign a priority to each upstream data packet 24 in one of two ways.

A first prioritizing method is to assign a priority for each upstream data packet 24 based upon a source port configuration of the subscriber access interface device 10. A priority of a single packet consists of two parts, a user priority that can be either normal or high, and a maximum latency representing a maximum amount of time a packet may be delayed between sending and receiving. The maximum latency is dynamic and decrements in value as the frame waits in a queue. The priority is determined from a combination of the user priority value and the maximum latency value and is assigned a priority value from 0 to 4. Higher priority packets are transmitted first. For example, if the subscriber access interface device 10 were configured with ten ports according to embodiment 1 of FIG. 2, a fraction of the ten ports is assigned as a voice port 68, a fraction is assigned as a video port 69, and a remaining fraction is assigned as a data port 70. Based upon the source port configuration, of which the subscriber access interface device 10 has a priori knowledge, the subscriber access interface device 10 generates a high priority and a minimum latency to each one of the voice ports 68 and video ports 69. Signals from each voice port 68 have the same minimum latency, which may be different than the minimum latency assigned to signals from the video ports 69. As part of the prioritization process the SAID CPU 60 in the subscriber access interface device 10 accepts a plurality of the upstream data packets 24 from the voice and video ports 68,69 according to their minimum latency and assigns the priority to each upstream data packet 24. The SAID CPU 60 then interleaves the upstream data packets 24 that are incoming from the data ports 70, assigns their priority, typically a "normal" priority and a longer minimum latency, and generates a multiplexer header 84 to reflect the assigned priorities. The first prioritizing method is most appropriate for the wired connection between the plurality of client devices 1 and the subscriber access interface device 10 and cannot be used for the wireless connection between the client devices 1 and the subscriber access interface device 10.

A second prioritizing method is to interpret the address header 25 of each upstream data packet 24. With specific reference to FIGS. 3 and 4 of the drawings, as part of the address header 25, each upstream data packet 24 carries an indication of the type of communications signal contained therein. The SAID CPU 60 interprets the address header 25 to determine the type of data contained in the SDU 48. Based upon the determination, the SAID CPU 60 assigns the appropriate priority and the minimum latency for each upstream data packet 24. Accordingly, the second prioritizing method requires additional processing by the SAID CPU 60. Once the appropriate priority is assigned, data packet encapsulation appending the multiplexer header 84 and interleaving remaining data packets 24 occurs as previously described. The second prioritizing method is most appropriate for the embodiments having a wireless connection between at least one of the plurality of client devices 1 and the subscriber access interface device 10, but may also be used with the wired connection between the client devices 1 and the subscriber access interface device 10. In the embodiment wherein the client device 1 and the subscriber access interface device 10 are integral with each other, prioritization, if any, occurs using either method. The SAID CPU 60 also calculates a cyclic redundancy check ("CRC") value 86 for the plurality of the upstream data packets 24 accepted by the SAID CPU 60. The CRC value 86 is used when the packet is received for error checking purposes. The SAID CPU 60 encapsulates the plurality of prioritized upstream data packets 24 and attaches the multiplexer header 84 at the beginning of the prioritized packets and the CRC value 86 at the end of the packet to create a multiplexed upstream baseband packet, a plurality of which comprise the multiplexed upstream baseband signal 23. The SAID CPU 60 transfers the multiplexed upstream baseband signal 23 to a subscriber access interface device Media Access Control Protocol Controller ("SAID MCU") 85 for further processing. The SAID MCU 85 encapsulates a plurality of the multiplexed upstream baseband packets and generates and appends a Media Access Control ("MAC") header 87 to produce a Payload Data Unit 88 ("PDU"). The SAID MCU 85 processes the encapsulated PDU 88 into upstream transmission fragments 89 suitable for transmission and reception over the IEEE 802.11 wireless channel. The MAC header 87 includes information regarding sequencing of the transmission fragments 89, the number of bytes in the transmission fragment and a total number of fragments in the transmission for purposes of reassembling the transmission fragments 89 after reception over the wireless channel. The upstream transmission fragments 89 are modulated onto an upstream wireless radio frequency carrier 4 by a first upstream modulator 39 to produce a first upstream modulated carrier signal 5. The first upstream modulated carrier signal 5 is a wireless communications signal and is wirelessly transmitted by the upstream transmitter 40 for reception by the network access interface device 6. Appropriate frequencies for the upstream wireless radio frequency carrier 4 may be 915 MHz, 2.4 GHz, or 5.8 GHz depending upon the allocated spectrum and preferably follow a wireless communications protocol that is IEEE 802.11 compliant. The IEEE 802.11 is a wireless networking standard that is specifically incorporated by reference herein. The actual frequencies used are a function of the available spectrum in a particular locality. Alternatively, a HiperLAN2 compliant process is appropriate. HiperLAN2 is also a wireless networking standard that is specifically incorporated by reference herein. The wireless link modulation and demodulation processes can employ a direct sequence spread spectrum process ("DSSS"), a frequency hopping spread spectrum process ("FSSS"), or a vector modulation process. The vector modulation processes preferably employ a quadrature phase shift keying process, but a bi-phase shift keying process, or any other modulation and demodulation process that is consistent with digital modulation techniques will work.

The first upstream modulated carrier signal 5 is received by an upstream receiver 41 in the network access interface device 6 and is demodulated by an upstream demodulator 42 in the network access interface device 6 to reproduce the data transmission fragments 89 in the network access interface device 6. A Media Access Control Processor 93 in the network access interface device 6 ("NAID MCU 93") re-constructs the transmitted encapsulated PDU 88 in the network access interface unit 6 to generate an upstream demodulated baseband signal 7. The upstream demodulated baseband signal 7 is a reconstructed version of the multiplexed upstream baseband signal 23 from which it is derived. It is not important that the upstream demodulated baseband signal 7 follow a particular format, but an IP format is preferred, and the format must preserve the prioritization, multiplexing, and destination addressing information. The general format for both the multiplexed upstream baseband signal 23 as well as the upstream demodulated baseband signal 7 should be digital and packet based. Due to the digital nature of the modulation and demodulation steps, the reconstruction process does not regenerate out of band noise that is injected into the upstream baseband signal 3 through wiring at the subscriber premises 66.

The first upstream modulated carrier signal 5 may be filtered either before transmission from the subscriber access interface device 10 or as it is received by the network access interface device 6. Filtering after reception by the network access interface device 6 is preferred. The inherent bandwidth limiting aspect of digital sampling further band limits the first upstream modulated carrier signal 5 to remove noise products from the wireless transmission process. Accordingly, the upstream demodulated baseband signal 7 recaptures the information integrity of the multiplexed upstream baseband signal 3 and disposes of the out of band noise presented on the upstream baseband signal 3 as it is transmitted from the client device 1 through the subscriber access interface device 10 and to the network access interface device 6. In certain cases, the out of band noise on the upstream baseband signal 3 gives rise to errors in the signal recovered after the demodulation process. By using appropriate forward error correction, preferably convolution encoding and decoding, the errors in the demodulation process may be identified and corrected to further restore the information integrity of the original upstream baseband signal 3.

A Processor 90 in the network access interface device 6 (hereinafter "NAID CPU 90") interprets the address header 25 of each upstream data packet 24 to determine a specified destination address. A look up table stored in memory in the network access interface unit 6 identifies the subscriber access interface unit or units 10 that support the destination address. If the destination address points to one of the subscriber access interface devices 10 that is serviced by the same network access interface device 6, the upstream data packet 24 having the specified destination address is forwarded to the downstream path and is transmitted to the appropriate destination subscriber access interface device 10 without being forward through the headend 21. If the destination address 72 matches that of one of the subscriber access interface devices 10 that is supported by the receiving network access interface device 6, the receiving network access interface device 6 strips the upstream data packet 24 from the upstream demodulated baseband signal 7 and re-packetizes it for transmission on the downstream path to the subscriber access interface device 10 designated by the destination address. Those upstream data packets 24 having destination addresses not found in the local look up table of the network access interface device 6 remain in the upstream demodulated baseband signal 7 for transmission to the headend 21. In relaying the upstream data packet 24 to the headend 21, a second upstream modulator 43 uses the upstream demodulated baseband signal 7 to modulate an upstream linear broadband radio frequency carrier 8 to produce a second upstream modulated carrier signal 9. The second upstream modulated carrier signal 9 is in a format that is compatible with the linear broadband network 2. For example, the second upstream modulator 43 can be a DOCSIS modem to modulate and transmit the second upstream modulated carrier signal in a DOCSIS format. The second upstream modulator 43 in the network access interface device 6 modulates the upstream linear broadband radio frequency carrier 8 and launches the second upstream modulated carrier signal 9 onto the linear broadband network 2 for transmission to the headend 21 for further distribution to the appropriate subscriber access interface device 10 and the destination device 71. Because the out of band noise in the upstream baseband signal 3 is removed, the tree and branch configuration present in the linear broadband network 2 does not present the same noise summing problems in the upstream path that are present in the conventional system. Accordingly, a method according to the teachings of the present invention is able to effectively utilize the part of the network spectrum allocated to the upstream path, on the linear broadband network, for example the 5–40 MHz spectrum on an HFC network.

In order to build the local look up table in the network access interface device 10, the subscriber access interface device 6 and the network access interface device 10 perform a negotiation in which, the subscriber access interface device 6 initiates a request for negotiation. The request occurs over a separate wireless service channel initiated by the subscriber access interface device 10 when a client device configuration changes. A change occurs when a client device is added or removed from a subscriber access interface device 10. The subscriber access interface device 10 transmits information to the network access interface device 6 concerning a number of client devices supported, the information type (i.e. voice, video, or data) of each supported client device 1,71, the addresses of each client device 1,71 as well as a requested bandwidth. The network access interface device 6 accepts the information and determines how it can most best and most efficiently support the change to be made and responds to the initiating subscriber access interface device 10 a level of service it will receive. The subscriber access interface device 10 accepts the level of service and establishes communication with the network access interface device 6 thereafter. The network access interface device modifies its local look-up table according to the new information received by the subscriber access interface device 10. In certain cases, the network access interface device 6 may not be able to fully accommodate the configuration change in which case it either refuses the requested configuration change, accommodates the configuration change, but reduces the level of service for other ones of the client devices in the configuration, or in rare cases, will reduce the level of service for one of the subscriber access interface devices that did not request a configuration modification.

Figure 7:
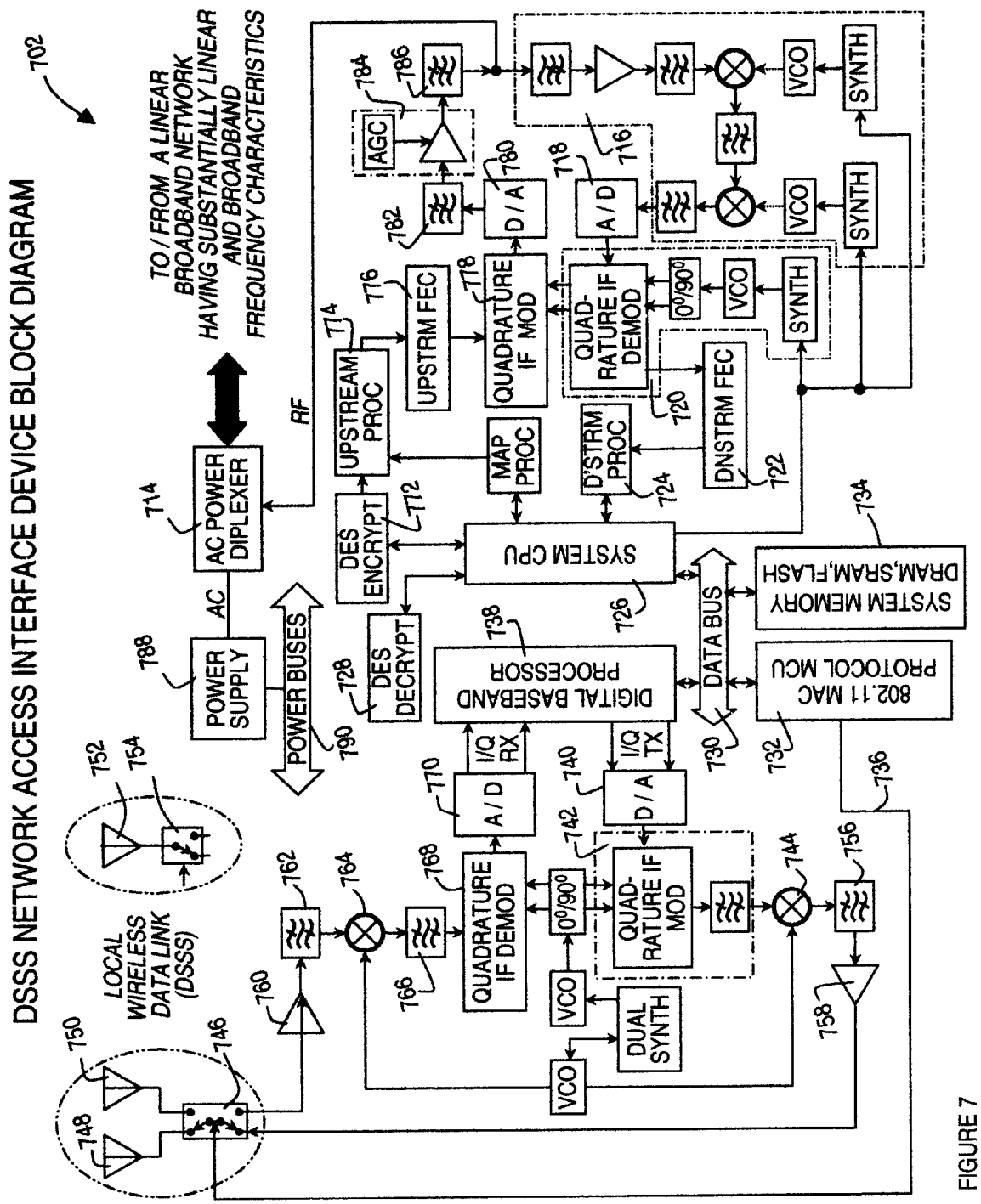
FIG. 7 is a representative block diagram of an embodiment of a direct sequence spread spectrum network access interface device for implementation of a method according to the teachings of the present invention.

With specific reference to FIG. 7 of the drawings, there is shown an embodiment of a Direct Sequence Spread Spectrum ("DSSS") Network Access Interface Device ("NAID") 702 according to the teachings of the present invention. The DSSS NAID 702 is made up of five major sections: a downstream modem, an upstream modem, an access point interface, a DSSS wireless downstream block, and a DSSS wireless upstream block.

In a specific embodiment as shown in FIG. 7 of the drawings, a 64/256 QAM modulated downstream RF signal having a frequency range of between 54 and 860 MHZ is received by a diplex filter 714 from the linear broadband network (2 in FIGS. 1 and 2 of the drawings). The downstream RF signal is filtered, amplified, and filtered prior to being twice down-converted in an RF tuner 716. The RF tuner 716 processes the downstream RF signal into a 36/44 MHz IF signal. A 10-bit downstream analog to digital converter 718 samples the analog IF signal converting it to a digital waveform. A quadrature IF demodulator 720 demodulates the 64/256 QAM digital waveform with recovered clock and carrier timing, filters, and equalizes the data. The result of the demodulation is transmitted to a downstream forward error correction processor 722, which synchronizes, de-interleaves, decodes using a Reed-Solomon polynomial, and de-randomizes the data. The error corrected and decoded output is transmitted to a downstream processor 724 that performs DOCSIS compliant physical and Media Access Control functions. Specifically, the downstream processor 724 provides concatenation of downstream fragments and provides filtering of up to 256 destination addresses. The downstream processor 724 also provides system timing and synchronization, quality of service prioritization, bandwidth allocation, error detection, error handling, error recovery, and performs negotiation procedures with the headend (21 in FIG. 1 of the drawings) for registering new NAIDs (6 in FIGS. 1 and 2 of the drawings). The downstream data is then sent to a system Central Processing Unit ("CPU") 726. The system CPU 726 provides 56-bit Data Encryption Standard ("DES") key information to a DES decryption processor 728 to perform privacy decryption functions. The Data Encryption Standard is hereby incorporated by reference. The system CPU 726 also provides control of the synthesizer functions for appropriate setting of the mixing and demodulation frequencies. The system CPU 726 also contains network management protocols such as SNMP, DHCP and NAT and Internet Protocol router capability to route data packets to appropriate SAIDs 10 based upon destination addresses. System memory 734 includes a direct memory access ("DMA") controller for handling the high data rate without intervention from the system CPU 726. The DMA controller manages the transfer of the decrypted data to the system memory 734 via a system data bus 730. The DMA controller manages the transfer of the data to an IEEE 802.11 Media Access Control ("MAC") protocol controller 732 for processing. As one of ordinary skill in the art appreciates, there is a high data rate to and from the MAC protocol controller 732. Accordingly, there is a need to buffer data into and out of the MAC protocol controller 732 using a system memory 734. The system CPU 726 provides information to the MAC protocol controller 732 regarding a destination SAID 10. This triggers the MAC protocol controller 732 to send a Request to Send ("RTS") signal directly to the destination SAID 10 . When the destination SAID 10 is ready to receive data, it issues a Clear to Send ("CTS") signal. The MAC protocol controller 732 receives the CTS signal. The MAC protocol controller 732 then formats the payload data unit (92 in FIG. 6 of the drawings) and appends to it a header (95 in FIG. 6 of the drawings) to generate a downstream data packet (75 in FIG. 6 of the drawings). The MAC protocol controller 732 transmits the downstream data packet to a digital baseband processor 738. The digital baseband processor 738 clocks and scrambles the downstream data packet and differentially encodes the downstream data packet before applying a spread spectrum modulation. The digital baseband processor 738 quadrature phase shift key modulates the packet to generate a baseband signal having I and Q components. The digital baseband processor 738 then spreads the I and Q symbols with a pseudo-random number sequence generator and sends it to a digital to analog converter 740 where the baseband signal is converted to an analog waveform. The analog waveform is transmitted to a quadrature IF modulator 742 that provides shaping and filtering and up-converts it into an IF signal. The gain controlled IF signal is further up-converted to the 2.4 to 2.5 GHz band by a transmission mixer 744. The output signal from the transmission mixer 744 is filtered at 756 and power controlled at 758 to an optimized output level before it is fed into a transmit/receive diversity switch 746. An optimum power level is application dependent and differs for each network access interface unit in a system. The diversity switch 746 connects the output signal to a transmit antenna 748 for transmission by the NAID 6 and subsequent reception by the SAID 10. A MAC switch control line 736 controls the position of the diversity switch 746 to connect the transmit antenna 748 for delivery of the request to send signal. The MAC switch control line 736 then switches the position of the diversity switch 746 to connect the receive antenna 750 for reception of the clear to send signal. As described and shown in FIG. 7, the NAID 6 may comprise separate transmit and receive antennas 748, 750 respectively with a double pole/double throw diversity switch 746. Alternatively, the NAID may comprise a single transmit/receive antenna 752 for use with a single pole/double throw diversity switch 754.

With further reference to FIG. 7 of the drawings, an upstream wireless signal having a frequency in the 2.4 to 2.5 GHz range is received by the receive antenna 750 and filtered with a dielectric filter (not shown). The diversity switch 746 is in a position connecting the receive antenna 750 to wireless receive circuitry in the NAID 6. A low noise amplifier 760 sets the received noise figure and appropriate signal gains of the received signal. After filtering at 762, the signal is down-converted in mixer 764 to a 280 MHz IF signal. The IF signal is bandpass filtered at 766 and is transmitted to quadrature demodulator 768. The quadrature demodulator 768 comprises a limiting amplifier, baseband demodulator, and baseband low pass filters. The resulting I and Q quadrature signals are converted to digital waveforms in the analog to digital converter 770 and transmitted to the digital baseband processor 738. The digital baseband processor 738 correlates the pseudo-random number spreading to remove it and to recover the differential quadrature phase shift keying data. The digital baseband processor detects, identifies, and locks onto the signal and uncovers the symbol timing phase and frequency. The digital baseband processor 738 uses the symbol timing phase and frequency to initialize a tracking loop for data acquisition. When the digital baseband processor 738 begins successful tracking of the demodulated data, it de-scrambles the direct spread data to prepare the upstream transmission fragments (89 in FIG. 4 of the drawings) for processing in the IEEE 802.11 MAC protocol controller 732. The MAC protocol controller 732 provides the concatenation function to recover the upstream PDU (88 in FIG. 4 of the drawings). Each encapsulated PDU comprises the MAC header (87 in FIG. 4) containing a preamble and a start frame delimiter, the data, and the CRC value (86 in FIG. 4). The MAC protocol controller 732 processes and interprets the MAC header and start frame delimiter, determines a mode and length of incoming PDU, and checks the CRC value. If the CRC value indicates that the data is corrupted, the MAC protocol controller 732 discards the current packet and issues a retransmission request. If the CRC value indicates that the data is acceptable, the MAC protocol controller 732 further processes the packet to strip off the MAC header 87 and launches the packet onto the system data bus 730 for delivery to the system CPU 726 via the system memory 734. The system CPU 726 supplies a 56-bit DES key to a DES encrypt block 772, which encrypts each packet received. Each encrypted packet is sent to an upstream processor 774 that handles elements of time synchronization with the headend (21 in FIG. 1), bandwidth request negotiation, and contention resolution. The packets are then Reed-Solomon encoded for forward error correction in an upstream forward error correction block 776. The upstream forward error correction block also randomizes, appends a preamble to a beginning of the packet, maps the QPSK/QAM modulation symbols, and pre-equalizes the transmission signal. At this point in the process, an output of the upstream forward error correction block 776 is a digital shaped pulse waveform. The digital waveform is then upconverted to an IF central frequency by a quadrature IF modulator 778 generating an output data burst containing data at a variable symbol rate in either a QPSK or 16-QAM format. A 10-bit digital to analog converter 780 converts the output data burst signal to a 5–65 MHz analog waveform. The analog waveform is filtered at 782 and amplified by an automatic gain controlled power amplifier 784. The amplified signal is filtered again at 786 before being launched onto the linear broadband network 2 through the diplexer filter 714. Power is delivered to the NAID via the coaxial connection to the linear broadband network (2 in FIG. 1 of the drawings). The AC power signal, at for example 60 Hz or 50 Hz, is superimposed onto the communications signal. The diplexer filter 714 separates the low frequency power signal from the higher frequency communications signal. The low frequency power signal is sent to power supply 788 where the AC power is converted to DC using known techniques and then distributed throughout the NAID over power busses 790.

Figure 8:
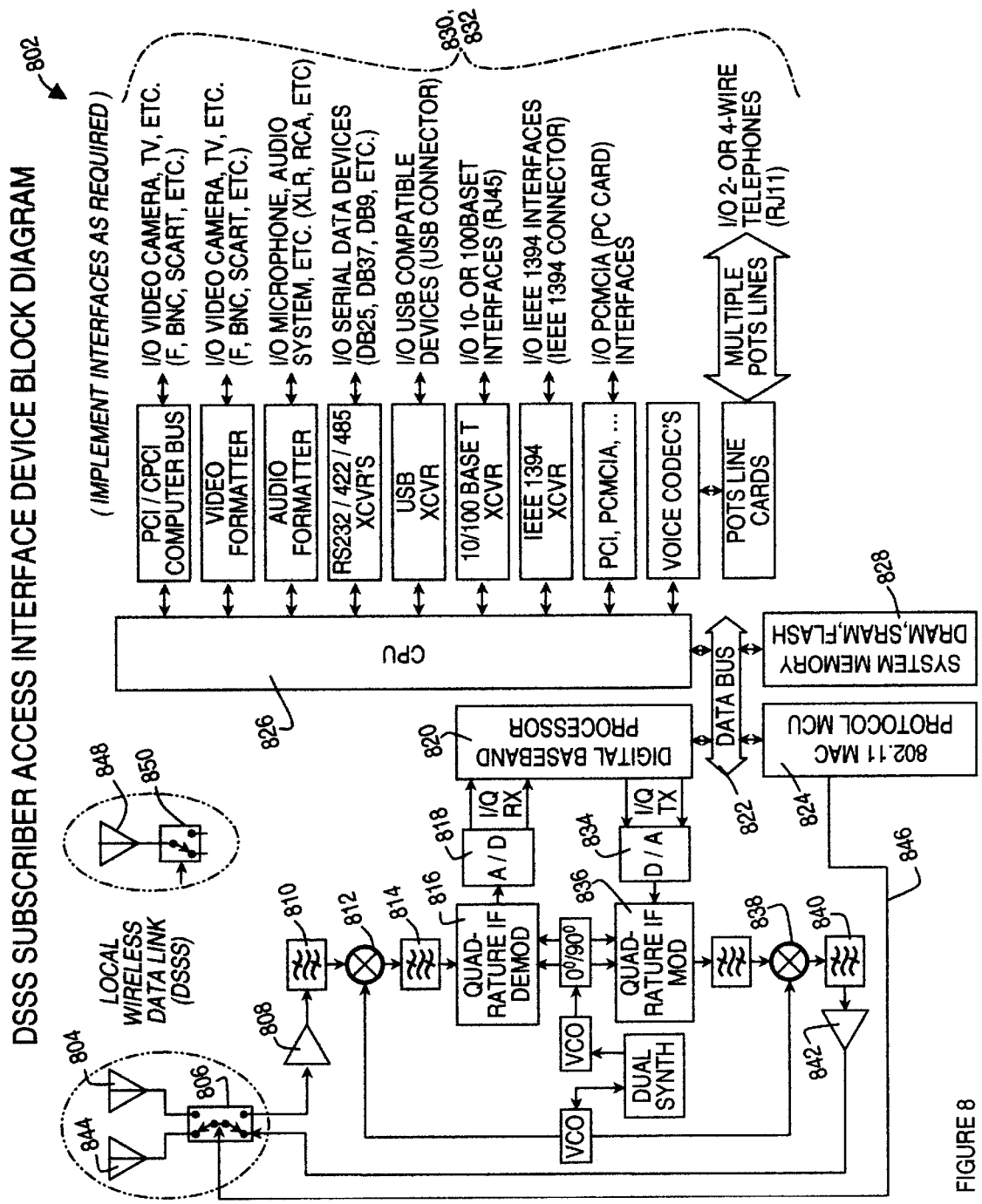
FIG. 8 is a representative block diagram of an embodiment of a direct sequence spread spectrum subscriber access interface device for implementation of a method according to the teachings of the present invention.

With specific reference to FIG. 8 of the drawings, there is shown a direct spread spectrum subscriber access interface unit block diagram 802 according to the teachings of the present invention in which an IEEE 802.11 wireless DSSS signal is received by receive antenna 804. The primary downstream function of the subscriber access interface unit 802 is delivery of the appropriate signal to a designated destination client device 830(71 in FIG. 2). With a diversity switch 806 in a receive position, the received signal is transmitted to a low noise amplifier 808, which sets the received noise figure and appropriate signal gains of the received signal. After filtering at 810, the signal is downconverted in mixer 812 to a 280 MHz IF signal. The IF signal is band-pass filtered at 814 and is transmitted to quadrature demodulator 816. The quadrature demodulator 816 comprises a limiting amplifier, baseband demodulator, and baseband low pass filters. The resulting I and Q quadrature signals are converted to digital waveforms in analog to digital converter 818 and transmitted to the digital baseband processor 820. The digital baseband processor 820 correlates the pseudo-random number spreading to remove it and to recover the differential quadrature phase shift keying data. The digital baseband processor 820 detects, identifies, and locks onto the signal and uncovers the symbol timing phase and frequency, The digital baseband processor 820 uses the symbol timing phase and frequency to initialize a tracking loop for data acquisition. When the digital baseband processor 820 begins successful tracking of the demodulated data, it de-scrambles the direct spread data to prepare the downstream transmission fragments (94 in FIG. 6 of the drawings) for launch onto a system data bus 822 and processing in IEEE 802.11 MAC protocol controller 824. The MAC protocol controller 824 provides the concatenation function to recover the downstream data packets (75 in FIG. 6 of the drawings). Each packet comprises the MAC header (87 in FIG. 6) containing a preamble and a start frame delimiter, the data, and the CRC value (86 in FIG. 4). The MAC protocol controller 824 processes and interprets the MAC header (87 in FIG. 6) and start frame delimiter, determines a mode and length of the incoming packet, and checks the CRC value (86 in FIG. 6). If the CRC value indicates that the data is corrupted, the MAC protocol controller 824 discards the current packet and issues a retransmission request. If the CRC value indicates that the data is acceptable, the MAC protocol controller 824 further processes the packet to strip off the MAC header and launches the packet onto the system data bus 822 for delivery to a system CPU 826 via the system memory 828. A system interface that comprises the digital baseband processor 820, the system data bus 822, the MAC protocol controller 824, the system memory 828, and the system CPU 826, is interrupt driven to support the high data transmission speeds. The system memory 828 comprises a direct memory access controller to handle actual data transfer to and from the system memory 828 without intervention from the system CPU 826 or MAC protocol controller 824. The MAC protocol controller 824 and the system CPU 826 are notified via hardware interrupt when data is ready for processing and when a memory receive buffer is full. The system CPU 826 receives and interprets the address header (25 if FIG. 6) of each data packet and de-multiplexes each packet for transmission to the designated destination client devices 830 (71 in FIG. 2).

With further reference to FIG. 8 of the drawings, a primary upstream function of the subscriber access interface unit is gathering, encoding, and multiplexing the signals from a plurality of initiating client devices 832 (1 in FIG. 2 of the drawings) onto a single signal for wireless transmission to the NAID (6 in FIG. 1 of the drawings). FIG. 8 of the drawings represents a DSSS embodiment of the SAID in which a plurality of initiating client devices 832 generate upstream signals. Each upstream signal is encoded into an upstream baseband signal (3 in FIG. 3 of the drawings). The system CPU 826 receives each upstream baseband signal 3, prioritizes, multiplexes, and generates and appends the address header (25 in FIG. 4 of the drawings) and the multiplexer header (84 in FIG. 4 of the drawings) onto each packet before launching onto the system data bus 822 for storage into the system memory 828. The MAC protocol controller 824 receives the plurality of packets stored in the system memory 828 and encapsulates and then fragments the packet for transmission over the IEEE 802.11 wireless link. The digital baseband processor 820 clocks and scrambles the downstream transmission fragments (89 in FIG. 4 of the drawings) and differentially encodes the downstream transmission fragments before applying a spread spectrum modulation. The digital baseband processor 820 quadrature phase shift key modulates each fragment to generate a baseband signal having I and Q components. The digital baseband processor 820 then spreads the I and Q symbols with a pseudo-random number sequence generator and sends it to a digital to analog converter 834 where the baseband signal is converted to an analog waveform. The analog waveform is transmitted to a quadrature IF modulator 836 that provides shaping and filtering and up-converts it into an IF signal. The gain controlled IF signal is further up-converted to the 2.4 to 2.5 GHz band by a transmission mixer 838. The output signal from the transmission mixer 838 is filtered at 840 and power controlled at 842 to an optimized output level before it is fed into the transmit/receive diversity switch 806. An optimum power level is application dependent and differs for each subscriber access interface unit in a system. The diversity switch 806 connects the output signal to a transmit antenna 844 for wireless transmission by the NAID and subsequent reception by the SAID. A MAC switch control line 846 controls the position of the diversity switch 806 to connect the transmit antenna 844 for delivery of the request to send signal. The MAC switch control line 846 then switches the position of the diversity switch 806 to connect the receive antenna 804 for reception of the clear to send signal. As described and shown in FIG. 8, the SAID 6 may comprise separate transmit and receive antennas 844, 804 respectively with a double pole/double throw diversity switch 806. Alternatively, the SAID may comprise a single transmit/receive antenna 848 for use with a single pole/double throw diversity switch 850. The MAC switch control line 846 controls the diversity switch 806, 850 similarly in both alternatives.

Figure 9:
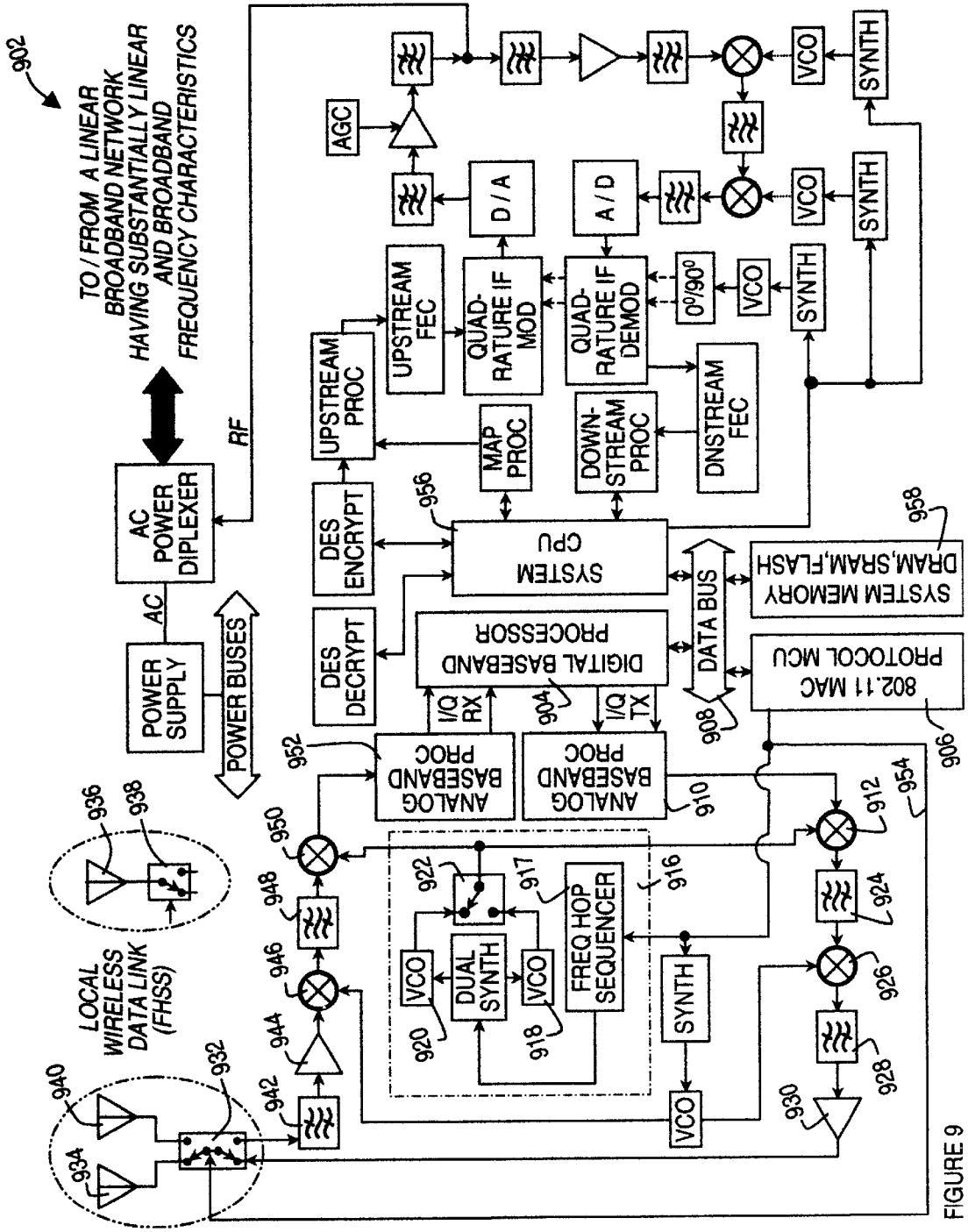
FIG. 9 is a representative block diagram of an embodiment of a frequency hopping spread spectrum network access interface device for implementation of a method according to the teachings of the present invention.

With specific reference to FIG. 9 of the drawings, there is shown a frequency hopping spread spectrum ("FHSS") embodiment of the network access interface device 902 according to the teachings of the present invention in which all elements are the same as described in the DSSS embodiment of the NAID 702 except for the transmission and reception circuitry disposed downstream and upstream, respectively, from a digital baseband processor 904. Accordingly, for purposes of eliminating duplication, it is the differing portion of the FHSS embodiment that is discussed in this paragraph. In the downstream process, the digital baseband processor 904 convolution encodes the data packets received from a MAC protocol controller 906 via a system data bus 908 into I and Q digital data channels. The digital baseband processor 904 sends the I and Q digital data channels to downstream analog baseband processor 910. The downstream analog baseband processor 910 filters, differentially encodes, and converts the digital signals to filtered and encoded analog equivalent signals. Accordingly, the data is QPSK modulated and comprises a baseband quadrature signal having I and Q components. The resulting signal is up-converted to an intermediate frequency in IF mixer 912. An input to the mixer 912 is an output of a frequency hopping generator 916. The generator 916 comprises two voltage controlled oscillators 918, 920 ("VCO") in a phase locked loop and a frequency hopping sequence controller 917. While one VCO 918 is operating as input to the IF mixer 912, the other VCO 920 is slewing to a new frequency. The MAC protocol controller 906 directs the frequency hopping sequence controller 917 as to the appropriate frequency to generate. Switch 922 toggles between the two VCOs 918, 920 as the frequencies slew between the various values. The IF signal is then filtered at 924 and up-converted again in mixer 926 to a 2.4 GHz to 2.5 GHz RF signal. The up-converted RF signal is then filtered at 928 to remove the IF image frequency. The filtered and up-converted signal is then amplified in power amplifier 930. Triple pole, double throw diversity switch 932 is in a transmit position and directs the amplified signal to transmit antenna 934 for wireless transmission to a receiving FHSS SAID, Alternatively, the FHSS NAID embodiment may use a single transmit/receive antenna 936 and a single pole/double throw diversity switch 938.

With further reference to FIG. 9 of the drawings, the FHSS NAID receives an IEEE 802.11 wireless signal at receive antenna 940. With the diversity switch 932 or 938 in a receive position, the received signal is filtered at dielectric filter 942. Low noise amplifier 944 sets the received noise figure and appropriate signal gain. The signal is then down-converted to a 280 MHz IF signal in RF mixer 946 and then filtered at 948 and further down-converted to reconcile the frequency hopping sequence in mixer 950. The frequency input to the mixer 950 comprises the output of the frequency hopping generator 916 as directed by the MAC protocol controller 906 and controlled by the frequency hopping sequence controller 917. The resulting IF signal is input into a downstream analog baseband processor 952. The analog baseband processor 952 down-converts the signal to baseband producing I and Q signals and digitizes the analog signals in a 10-bit analog to digital converter for transmission to the digital baseband processor 904. The digital baseband processor 904 performs a complex frequency rotation to adjust for any frequency offset and phase error between the transmitter in the SAID and the receiver in the NAID. The digital baseband processor 904 then provides symbol timing and carrier frequency acquisition and tracking. The digital baseband processor 904 also provides automatic gain control on the demodulated baseband signal and a decision threshold comparison of the I and Q channel against an appropriate reference level. The pair of I and Q soft decision signals is then sent to a Viterbi Decoder portion of the digital baseband processor 904. The digital baseband processor 904 also determines the synchronization boundary of the QPSK symbols, performs the forward error correction decoding process, and recovers the data transmission fragments for interpretation and processing by the MAC protocol controller 906. Each transmission fragments has a preamble and header containing a start frame delimiter, data, and a CRC value. The Mac protocol controller 906 processes the start frame delimiter and the header, checks the CRC value, and determines the mode and the length of the incoming message. If the CRC value indicates that the data is corrupt, the MAC protocol controller 906 issues a retransmission request for delivery to the SAID. If the CRC value indicates that the data is not corrupt, MAC protocol controller 906 recovers the packet and sends it to a system CPU 956 via the system data bus 908 and system memory 958.

Figure 10:
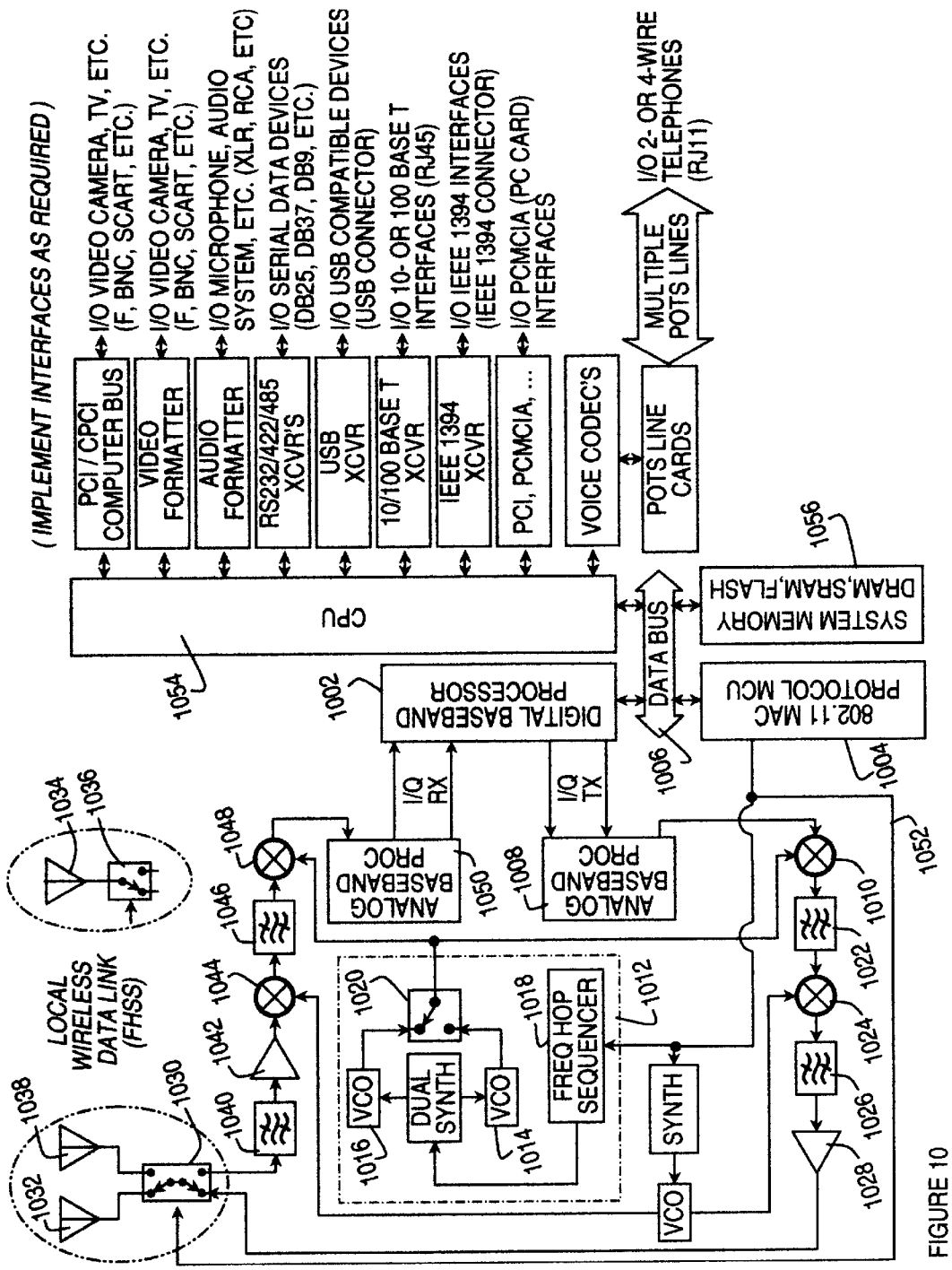
FIG. 10 is a representative block diagram of an embodiment of a frequency hopping spread spectrum subscriber access interface device for implementation of a method according to the teachings of the present invention.

With specific reference to FIG. 10 of the drawings, there is shown a FHSS embodiment of the SAID according to the teachings of the present invention in which all elements are the same as described in the DSSS embodiment of the SAID 802 except for the transmission and reception circuitry disposed downstream and upstream, respectively, from a digital baseband processor 1002 in FIG. 10 (820 in FIG. 8). Accordingly, for purposes of eliminating duplication, it is the different portion of the FHSS embodiment that is discussed in this paragraph. In the upstream process, the digital baseband processor 1002 convolution encodes the data packets received from a MAC protocol controller 1004 via a system data bus 1006 into I and Q digital data channels. The digital baseband processor 1002 sends the I and Q digital data channels to upstream analog baseband processor 1008. The upstream analog baseband processor 1008 filters, differentially encodes, and converts the digital signals to filtered and encoded analog equivalent signals. Accordingly, the data is QPSK modulated and comprises a baseband quadrature signal having I and Q components. The resulting signal is up-converted to an intermediate frequency in IF mixer 1010. An input to the IF mixer 1010 is an output of a frequency hopping generator 1012. The frequency hopping generator 1012 comprises two voltage controlled oscillators 1014, 1016 ("VCO") in a phase locked loop and a frequency hopping sequence controller 1018. While one VCO 1014 is operating as input to the IF mixer 1010, the other VCO 1016 is slewing to a new frequency. The MAC protocol controller 1004 directs the frequency hopping sequence controller 1018 as to the appropriate frequency to generate. Switch 1020 toggles between the two VCOs 1014, 1016 as the frequencies slew between the various values. The IF signal is then filtered at 1022 and up-converted again in mixer 1024 to a 2.4 GHz to 2.5 GHz RF signal. The up-converted RF signal is then filtered at 1026 to remove the IF image frequency. The filtered and up-converted signal is then amplified in power amplifier 1028. Triple pole, double throw diversity switch 1030 is in a transmit position and directs the amplified signal to transmit antenna 1032 for wireless transmission to a receiving FHSS NAID. Alternatively, the FHSS NAID embodiment may use a single transmit/receive antenna 1034 and a single pole/double throw diversity switch 1036 instead of separate transmit and receive antennas 1032 and 1038 respectively and diversity switch 1030.

With further reference to FIG. 10 of the drawings, for downstream operation, the FHSS SAID receives an IEEE 802.11 wireless signal at the receive antenna 1038. With the diversity switch 1030 or 1036 in a receive position, the received signal is filtered at dielectric filter 1040. Low noise amplifier 1042 sets the received noise figure and appropriate signal gain. The signal is then down-converted to a 280 MHz IF signal in RF mixer 1044 and then filtered at 1046 and further down-converted to reconcile the frequency hopping sequence in mixer 1048. The frequency input to the mixer 1048 comprises the output of the frequency hopping generator 1012 as directed by the MAC protocol controller 1004 and controlled by the frequency hopping sequence controller 1018. The resulting IF signal is input into a downstream analog baseband processor 1050. The downstream analog baseband processor 1050 down-converts the signal to baseband, producing I and Q signals, and digitizes the analog signals in a 10-bit analog to digital converter for transmission to the digital baseband processor 1002. The digital baseband processor 1002 performs a complex frequency rotation to adjust for any frequency offset and phase error between the transmitter in the NAID and the receiver in the SAID. The digital baseband processor 1002 then provides symbol timing and carrier frequency acquisition and tracking. The digital baseband processor 1002 also provides automatic gain control on the demodulated baseband signal and a decision threshold comparison of the I and Q channel against an appropriate reference level. The pair of I and Q soft decision signals is then sent to a Viterbi Decoder portion of the digital baseband processor 1002. The digital baseband processor 1002 also determines the synchronization boundary of the QPSK symbols, performs the forward error correction decoding process, and recovers the data transmission fragments for interpretation and processing by the MAC protocol controller 1004. Each transmission fragment has a preamble and header containing a start frame delimiter, data, and a CRC value. The Mac protocol controller 1004 processes the start frame delimiter and the header, checks the CRC value, and determines the mode and the length of the incoming message. If the CRC value indicates that the data is corrupt, the MAC protocol controller 1004 issues a retransmission request for receipt by the NAID. If the CRC value indicates that the data is not corrupt, MAC protocol controller 1004 recovers the packet and sends it to a system CPU 1054 via the system data bus 1006 and system memory 1056.

Figure 11:
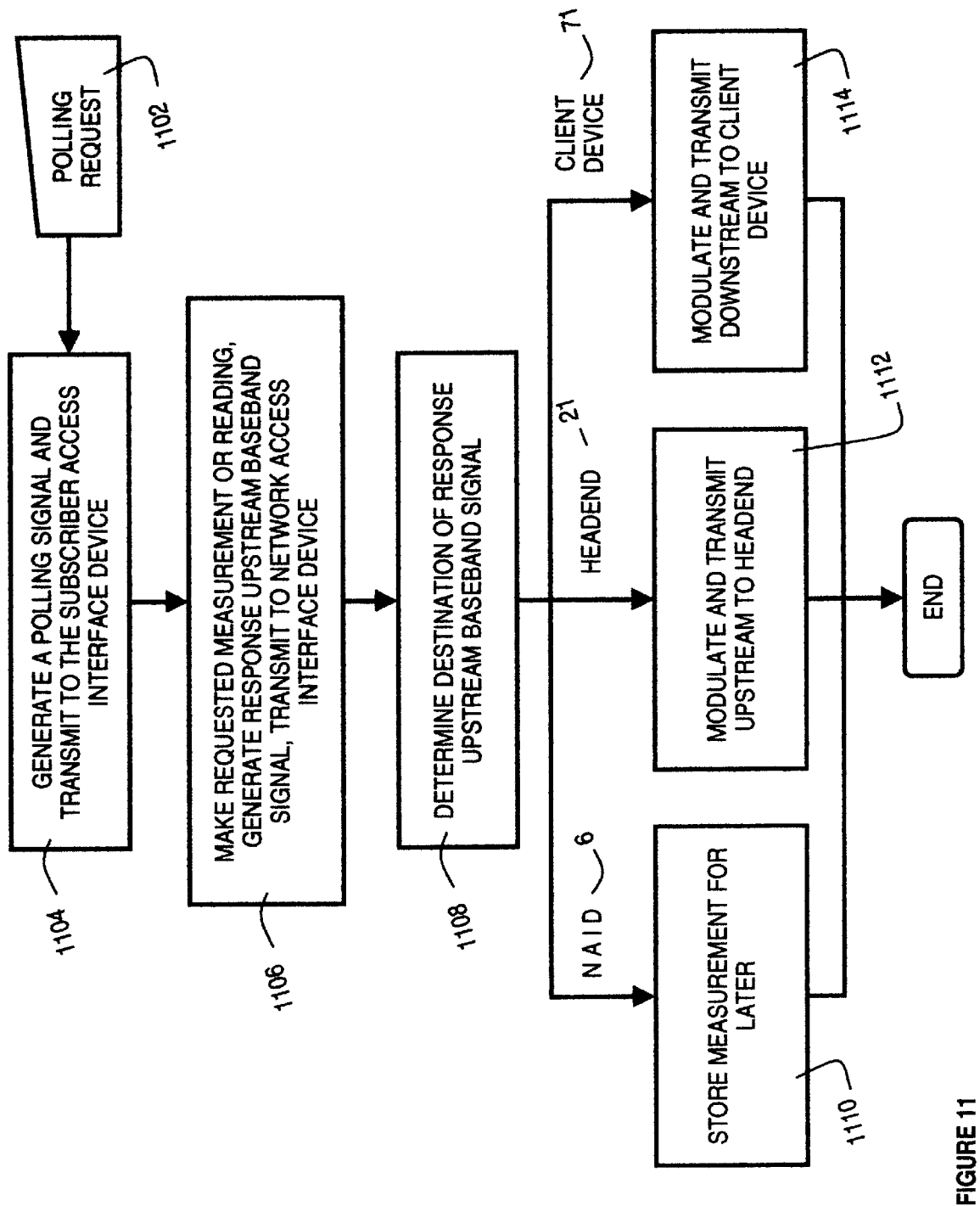
FIG. 11 is a flow diagram of the polling process of an embodiment according to the teachings of the present invention.

With specific reference to FIG. 11 of the drawings, a specific beneficial application that takes advantage of the upstream communication capabilities of a system according to the teachings of the present invention is a polling system, whereby a polling request 1102 is received by the network access interface device 6 to take a measurement for immediate reporting or retrieval at a later time. The polling request 1102 may be generated at the network access interface device 6 upon initiation from the network access interface device 6 itself, another set-top box in the subscriber premises 66, a downstream client device 1, the headend 21, or from a device external to the linear broadband network 2 and contains information specifying the content of the request as well as the destination of a response to the request. Upon the receiving the polling request 1102, the network access interface device 10 generates a polling signal and transmits it to the subscriber access interface device 10 in step 1104. The subscriber access interface device 10 responds to the polling signal by generating a response upstream baseband signal 1106. The response upstream baseband signal contains the data gathered in response to the polling request 1102 as well as an address of an intended destination of the data. A data format of the response upstream baseband signal is the same as that of the upstream baseband signal 3 and is, therefore, processed similarly. The subscriber access interface device 10 modulates and transmits the response upstream baseband signal to the network access interface device 6. The network access interface device 6 in step 1108 determines whether the data contained in the response upstream baseband signal is to be stored in the network access interface device 6 for later retrieval, whether the response upstream baseband signal is to be forwarded directly to the headend 21, or whether the data is to be sent to one of the destination client devices 71. If the data contained in the response upstream baseband signal is to be stored, the network access interface device 6 receives the response upstream baseband signal, converts it to data, and stores the data in memory for later retrieval shown in step 1110. If the data contained in the response upstream baseband signal is to be transmitted to the headend 21, the network access interface device 6 receives the response upstream baseband signal, demodulates, re-modulates, and transmits it to the headend 21 along with the upstream data shown in step 1112. If the data contained in the response upstream baseband signal is to be transmitted to one of the destination client devices 71, the network access interface device 6 receives the response upstream baseband signal, demodulates the upstream baseband signal and forwards it to the destination client device 71 shown in step 1114. Stored data may be retrieved at any time upon a request from the headend 21 or any one of the client devices 1. The polling capability has application in areas of network maintenance and meter reading, for example.

The network access interface device 6 supports a plurality of the subscriber access interface devices 6. Accordingly, the network access interface device 6 performs an arbitration process whereby the network access interface device 6 controls the timing of the receipt of transmissions from each of the subscriber access interface devices 10 supported by the network access interface device 6. Preferably, the arbitration function follows the process as defined in the IEEE 802.11 standard, the contents of which are specifically incorporated by reference herein, in which the subscriber access interface device 6 transmits a signal to the network access interface device 10 requesting access to a transmission channel. The network access interface device 10 responds with a channel clear after which the subscriber access interface device 10 transmits for a certain period of time. The transmission is acknowledged with an indication of whether the upstream data transmission fragments 89 were successfully received or not, and the process repeats for other subscriber access interface devices 10. As one of ordinary skill in the art appreciates, the network access interface device 6 may be built to accept a plurality of the first upstream modulated carrier signals 5 in order to increase upstream bandwidth between the network access interface device 6 and the subscriber access interface device 10.

Under certain circumstances, it is possible that a transient obstruction can disturb the communications link between the subscriber access interface device 10 and its associated network access interface device 6 or that a network access interface device 6 is utilizing all of its capacity for communications operations. Each subscriber access interface device 10 has a predetermined threshold against which it measures whether an existing communication link is adequate. The predetermined threshold may be a measurement of bit error rate, latency of upstream data packet transmission, signal strength, or a combination thereof. With reference to FIG. 1 of the drawings, In the event that the communications link falls below the predetermined threshold, the subscriber access interface device 10 seeks and establishes an alternate communications link 65 with an alternate network access interface device 31.

Figure 5:
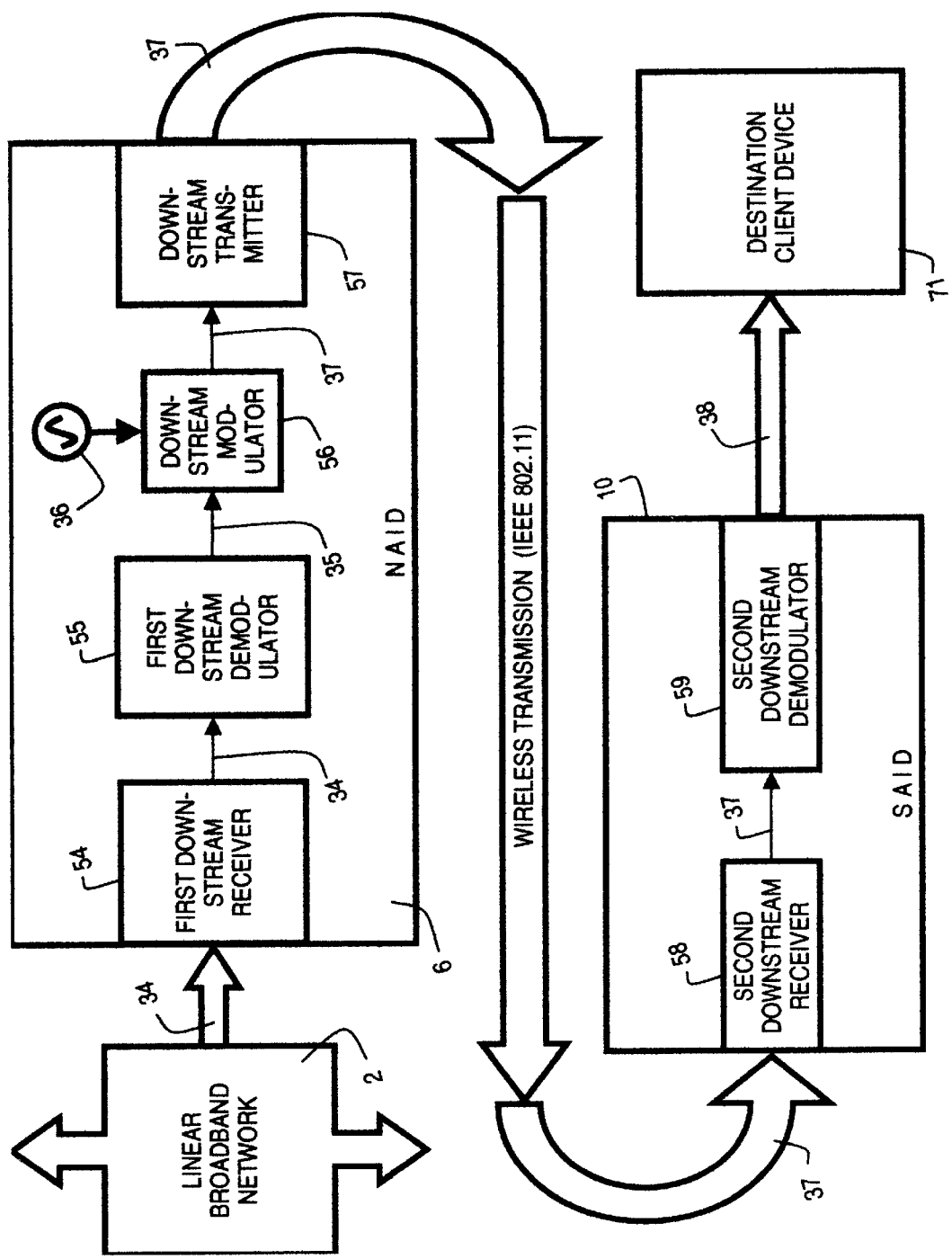
FIG. 5 is a representative view of a downstream signal flow according to the teachings of the present invention from linear broadband network to a destination client device.
Figure 6:
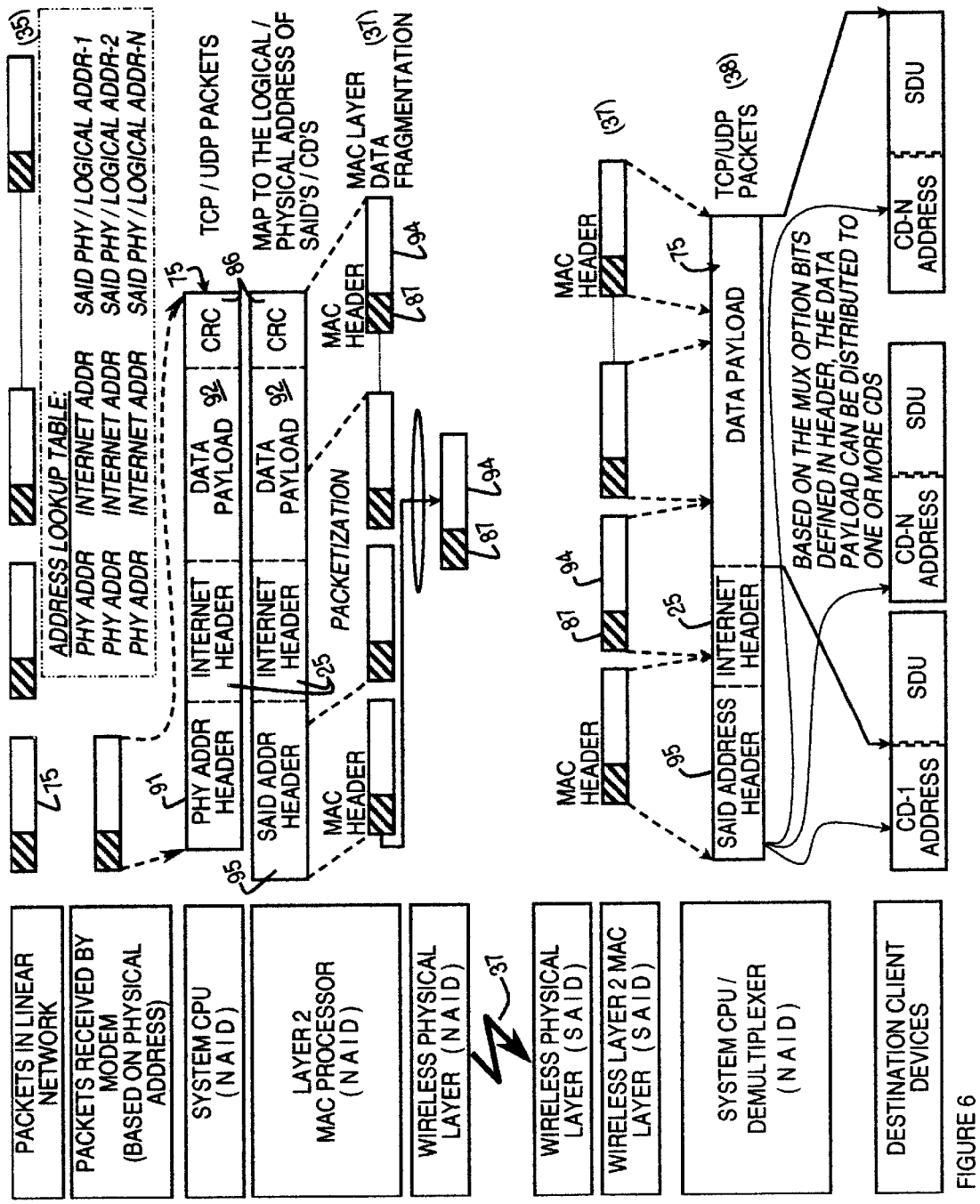
FIG. 6 is a representative diagram of data packets at various stages of a downstream data transmission process.

The downstream path does not share the same noise problems with the upstream path. A system according to the teachings of the present invention, however, provides the opportunity to advantageously utilize the same infrastructure for the downstream path. Additionally, the downstream path permits the cable television service providers to offer bi-directional communication services traditionally handled by the telephone companies. With reference to FIGS. 5 and 6 of the drawings, the downstream process comprises the network access interface device 6 accepting at least one first downstream modulated carrier signal 34 from the linear broadband network 2. A first downstream receiver 54 in the network access interface device 6 receives the first downstream modulated carrier signal 34 and transmits it to a DOCSIS compliant first downstream demodulator 55. The first downstream demodulator 55 demodulates the first downstream modulated carrier signal 34 to produce a first downstream baseband signal 35 comprising a series of downstream data packets 75. Each downstream data packet 75 has a physical address header 91, an address header 25 in an IP dotted quad format, a downstream data payload 92, and the CRC byte 86. The NAID CPU 90 interprets the physical address header 91 of each of the downstream data packets 75. If the physical address points to one or more of the subscriber access interface units 10 supported by the network access interface unit 6, the NAID CPU 90 uses a downstream look-up table to re-map a physical address contained in the physical address header 91 into a corresponding logical subscriber access interface device address header 95 for further downstream processing. If the physical address does not match, the packet is not further processed. The downstream data packets 75 destined for local subscriber access interface devices 10 are further processed as part of the first downstream baseband signal 35. The NAID MCU 93 fragments the packets in the first downstream baseband signal 35 to produce downstream transmission fragments 94 and appends the MAC header 87 for purposes of sequencing and reassembly of the downstream transmission fragments 94 as they are received by the subscriber access interface device 10.

A downstream modulator 56 modulates the first downstream baseband signal 35 onto at least one downstream wireless radio frequency carrier 36 to produce at least one second downstream modulated carrier signal 37. The network access interface device 6 may also encode each downstream modulated carrier signal 37 with forward error correction encoding prior to transmission. In a preferred embodiment, convolution encoding is used for forward error correction. A downstream transmitter 57 transmits the at least one second downstream modulated carrier signal 37 wirelessly to the subscriber access interface device 10. The second downstream receiver 58 in the subscriber access interface device 10 receives the second downstream modulated carrier signal 37 and transmits it to a second downstream demodulator 59. The second downstream demodulator 59 demodulates the at least one second downstream modulated carrier signal 37 to produce at least one second downstream baseband signal 38. The SAID MCU 85 interprets the downstream MAC header 87 and reassembles the downstream transmission fragments 94 to reproduce the downstream data packet 75. If forward error correction has been used, the SAID CPU 60 also decodes each downstream data packet baseband signal 38 prior to transmission to the destination client device 71. The second downstream baseband signal 35 may, but need not, have the same format as the first downstream baseband signal 35. The information integrity, however, is preserved. It is preferred that the first downstream baseband signal 35 uses an IP format. The second downstream baseband signal 38 is a packetized signal, which is processed by the SAID CPU 60 to interpret a logical subscriber access interface device header 95 of each downstream data packet 75. The logical subscriber access interface device header 95 contains de-multiplexing information for purposes of providing quality of service to higher priority data such as voice and video. The SAID CPU 60 interprets the header and de-multiplexes the downstream data packets 75 according to their priorities. The address header 25 indicates the IP address of the destination device 71 to which the data is to be forwarded. The SAID CPU 60 interprets the address header and transmits each downstream data packet 75 to the appropriate destination client device 71.

In the case of a wired subscriber access interface device 10, the SAID CPU 60 directs each downstream data packet 75 to an appropriate data port according to a hardware configuration, each port having its own unique IP address. In the case of a wireless connection between the subscriber access interface device 10 and the destination client device 71, the second downstream baseband signal 38 is modulated onto at least one second downstream wireless radio frequency carrier to produce a third downstream modulated carrier signal which is transmitted wirelessly. Each of the destination client devices 71 receives the third downstream modulated carrier signal and demodulates it to a third downstream baseband signal re-producing the information contained in the downstream data packets 75. Each destination client device 71 interprets the address header 25 of each downstream data packet 75 searching for a single match to the destination address. If the destination address matches the address of the destination client device 71, the destination client device 71 accepts, decodes, and presents the downstream data packet 75 containing the matching destination address. The downstream data packets 75 having destination addresses that do not match are not presented by the destination client device 71 and are discarded after interpreting the non-matching destination address. The present invention has been described by way of example. Modifications and variations to the teachings in the present disclosure are possible without departing from the scope of the appended claims.

What is claimed is:

1. A method of wirelessly communicating information from a client device located at a subscriber's premises to a linear broadband network located remotely from said subscriber's premises to eliminate a wired subscriber drop, said linear broadband network having substantially linear and broadband frequency characteristics, said method comprising the steps of:

generating an upstream baseband signal, said upstream baseband signal having a predefined format, modulating said upstream baseband signal onto at least one upstream wireless radio frequency carrier to generate at least one first upstream modulated carrier signal, transmitting said at least one first upstream modulated carrier signal wirelessly from said client device, located at said subscriber's premises, to a network interface device, located proximately to sad linear broadband network, thereby eliminating said wired subscriber drop, receiving said at least one first upstream modulated carrier signal at said network access interface device that is located proximately to and coupled to said linear broadband network, demodulating said at least one first upstream modulated carrier signal to produce an upstream demodulated baseband signal, and modulating said upstream demodulated baseband signal onto at least one upstream linear broadband radio frequency carrier to produce at least one second upstream modulated carrier signal having a signal format compatible with said linear broadband network.

2. A method of communicating as recited in claim 1 and further comprising the step of processing said upstream demodulated baseband signal to substantially reconstruct said upstream baseband signal to said predefined format.

3. A method of communicating as recited in claim 1 and further comprising the step of processing said upstream demodulated baseband signal to substantially reconstruct said upstream baseband signal to a format different from said predefined format.

4. A method of communicating as recited in claim 1 wherein the step of processing further comprises the step of correcting errors present in said upstream demodulated baseband signal to restore information integrity of said upstream baseband signal.

5. A method of communicating as recited in claim 1 and further comprising the step of filtering said at least one first upstream modulated carrier signal.

6. A method of communicating as recited in claim 5 wherein said step of filtering occurs prior to the step of transmitting said at least one first upstream modulated carrier signal.

7. A method of communicating as recited in claim 5 wherein said step of filtering occurs after the step of receiving said at least one first upstream modulated carrier signal.

8. A method of communicating as recited in claim 1 wherein said linear broadband network is a hybrid fiber coaxial network.

9. A method of communicating as recited in claim 1 wherein said linear broadband network is a linear fiber network.

10. A method of communicating as recited in claim 1 wherein said linear broadband network is a linear coaxial network.

11. A method of communicating as recited in claim 1 wherein said linear broadband network is a cable TV network.

12. A method of communicating as recited in claim 1, the step of generating and modulating occurring in said client device.

13. A method of communicating as recited in claim 1, the client device communicating with a subscriber access interface device, the subscriber access interface device performing the steps of modulating and transmitting.

14. A method of communicating as recited in claim 13, said client device communicating with said subscriber access device over a wireless connection.

15. A method of communicating as recited in claim 13, the client device communicating with said subscriber access device over a wired connection.

16. A method of communicating as recited in claim 1 wherein said step of generating said upstream baseband signal further comprises the steps of generating an upstream analog signal, digitizing said upstream analog signal to produce a corresponding upstream digital signal, and converting said upstream digital signal to said upstream baseband signal.

17. A method of communicating as recited in claim 16, wherein the step of generating said upstream analog signal comprises generating a telephone signal.

18. A method of communicating as recited in claim 17, wherein the step of generating said telephone signal comprises generating a voice signal.

19. A method of communicating as recited in claim 17, wherein the step of generating said telephone signal comprises generating a telephonic fax signal.

20. A method of communicating as recited in claim 17, wherein the step of generating said telephone signal comprises generating a telephonic data modem signal.

21. A method of communicating as recited in claim 16, wherein the step of generating said analog signal comprises generating a video signal.

22. A method of communicating as recited in claim 16, wherein the step of generating said analog signal comprises generating an audio signal.

23. A method of communicating as recited in claim 1, the step of transmitting said at least one first upstream modulated carrier signal wirelessly comprises transmitting said at least one first upstream modulated carrier signal wirelessly from each one of a plurality of subscriber access interface devices.

24. A method of communicating as recited in claim 23, the step of transmitting said at least one upstream modulated carrier signal wirelessly from each one of said plurality of subscriber access interface devices further comprising the step of arbitrating for access to said network access interface device from said plurality of subscriber access interface devices.

25. A method of communicating as recited in claim 1, the steps of modulating and demodulating said upstream baseband signal onto said at least one upstream wireless radio frequency carrier using a direct sequence spread spectrum process.

26. A method of communicating as recited in claim 1, the steps of modulating and demodulating said upstream baseband signal onto said at least one upstream wireless radio frequency carrier using a frequency hopping spread spectrum process.

27. A method of communicating as recited in claim 1, the steps of modulating and demodulating said upstream baseband signal onto said at least one upstream wireless radio frequency carrier using a vector modulation process.

28. A method of communicating as recited in claim 27, the steps of modulating and demodulating said upstream baseband signal onto said at least one upstream wireless radio frequency carrier using a quadrature phase shift keying process.

29. A method of communicating as recited in claim 27, the steps of modulating and demodulating said upstream baseband signal onto said at least one upstream wireless radio frequency carrier using a bi-phase shift keying process.

30. A method of communicating as recited in claim 1, the steps of modulating and demodulating said upstream baseband signal onto said at least one upstream wireless radio frequency carrier using an IEEE 802.11 compliant process.

31. A method of communicating as recited in claim 1, the steps of modulating and demodulating said upstream baseband signal onto said at least one upstream wireless radio frequency carrier using a HiperLAN2 compliant process.

32. A method of communicating as recited in claim 1 and further comprising the steps of:

generating a polling signal at said network access interface device, receiving said polling signal at a subscriber access interface device, responding to said polling signal by generating a response upstream baseband signal, transmitting said response upstream baseband signal, and receiving said response upstream baseband signal in said network access interface device.

33. A method of communicating as recited in claim 32 and further comprising the step of forwarding said response upstream baseband signal to a headend on said linear broadband network.

34. A method of communicating as recited in claim 32 and further comprising the step of storing said response upstream baseband signal for retrieval of said response upstream baseband signal upon request.

35. A method of communicating as recited in claim 1, the step of generating an upstream baseband signal further comprising the steps of generating a communication signal in each one of a plurality of said client devices, converting each said communication signal into a respective one of said upstream baseband signals, time division multiplexing each said upstream baseband signal in a subscriber access interface device to produce a multiplexed upstream baseband signal and the step of modulating further comprising the step of modulating said multiplexed baseband signal onto said at least one upstream wireless radio frequency carrier.

36. A method of communicating as recited in claim 35, wherein the step of converting said communication signal further comprises the step of coupling said upstream baseband signal to said subscriber access interface through a wired connection.

37. A method of communicating as recited in claim 35, wherein the step of converting said communication signal further comprises the step of coupling said upstream baseband signal to said subscriber access interface device through a wireless connection.

38. A method of communicating as recited in claim 35, each upstream baseband signal comprising a plurality of upstream data packets, the method further comprising the steps of prioritizing a launch of each upstream data packet onto said multiplexed upstream baseband signal to control latency of each individual upstream data packet.

39. A method of communicating as recited in claim 38 and further comprising the steps of interpreting a header of each upstream data packet, assigning a priority to each upstream data packet, producing an assigned priority for each upstream data packet, and multiplexing each upstream data packet according to said assigned priority.

40. A method of communicating as recited in claim 38 and further comprising the steps of assigning a priority to each upstream data packet based upon a source port configuration, producing an assigned priority for each upstream data packet, and multiplexing each upstream data packet according to said assigned priority.

41. A method of communicating as recited in claim 1 and further comprising the step of:

controlling a timing of the step of receiving said first upstream modulated carrier signal.

42. A method of communicating as recited in claim 1 and further comprising the step of filtering a spectral range of all of said at least one upstream modulated carrier signal.

43. A method of communicating as recited in claim 1 and further comprising the step of establishing a communications link with an alternate network access interface device in the event of a communication link degradation below a predetermined threshold with said network access interface device.

44. A method of bidirectionally and wirelessly communicating bi-directional information between a client device located at a subscriber's premises and a linear broadband network located remotely from said subscriber's premises to eliminate a wired subscriber drop, said linear broadband network having substantially linear and broadband frequency characteristics comprising steps of:

generating an upstream baseband signal, said upstream baseband signal having a predefined format, modulating said upstream baseband signal onto at least one upstream wireless radio frequency carrier to generate at least one first upstream modulated carrier signal, transmitting said at least one first upstream modulated carrier signal wirelessly from said client device, located at said subscriber's premises, to a network interface device located proximately to said linear broadband network, hereby eliminating said wired subscriber drop, receiving said at least one first upstream modulated carrier signal at a network access interface device that is located proximately to and coupled to the linear broadband network, demodulating said at least one first upstream modulated carrier signal to produce an upstream demodulated baseband signal, modulating said upstream demodulated baseband signal onto at least one upstream linear broadband radio frequency carrier to produce at least one; second upstream modulated carrier signal having a sign format compatible with the linear broadband network, receiving at least one downstream linear broadband network radio frequency carrier signal comprising a first downstream modulated carrier signal from the linear broadband network, demodulating said at least one first downstream modulated carrier signal to produce at lest one first downstream baseband sign having a predefined format, modulating said at least one first downstream baseband signal onto at least one downstream wireless radio frequency carrier to generate at least one second modulated downstream carrier signal, transmitting said at least one second modulated downstream carrier signal wirelessly, receiving said at least one second modulated downstream carrier signal, demodulating said at least one second modulated downstream carrier signal to produce at least one second downstream baseband signal, transmitting said at least one second downstream baseband signal.

45. A method of communicating as recited in claim 44 and further comprising the step of processing said upstream demodulated baseband signal to substantially reconstruct said upstream baseband signal to said predefined format.

46. A method of communicating as recited in claim 44 and further comprising the step of processing said upstream demodulated baseband signal to substantially reconstruct said upstream baseband signal to a format different from said predefined format.

47. A method of communicating as recited in claim 44 wherein the step of processing further comprises the step of correcting errors present in said upstream demodulated baseband signal to restore information integrity to correspond with said upstream baseband signal.

48. A method of communicating as recited in claim 44 and further comprising the step of filtering said at least one upstream modulated carrier signal.

49. A method of communicating as recited in claim 48 wherein said step of filtering occurs prior to the step of transmitting said at least one first upstream modulated carrier signal.

50. A method of communicating as recited in claim 48 wherein said step of filtering occurs after the step of receiving said at least one first upstream modulated carrier signal.

51. A method of communicating as recited in claim 44 wherein said linear broadband network is a hybrid fiber coaxial network.

52. A method of communicating as recited in claim 44 wherein said linear broadband network is a linear fiber network.

53. A method of communicating as recited in claim 44 wherein said linear broadband network is a linear coaxial network.

54. A method of communicating as recited in claim 44 wherein said linear broadband network is a cable TV network.

55. A method of communicating as recited in claim 44, the step of generating and modulating occurring in said client device.

56. A method of communicating as recited in claim 44, the client device communicating with a subscriber access interface device, the subscriber access interface device performing the steps of modulating and transmitting.

57. A method of communicating as recited in claim 56, said client device communicating with said subscriber access interface device over a wireless connection.

58. A method of communicating as recited in claim 56, said client device communicating with said subscriber access interface device over a wired connection.

59. A method of communicating as recited in claim 44 wherein said step of generating said upstream baseband signal further comprises the steps of generating an upstream analog signal, digitizing said upstream analog signal to produce a corresponding upstream digital signal, and converting said upstream digital signal to said upstream baseband signal.

60. A method of communicating as recited in claim 59, wherein the step of generating said analog signal comprises generating a telephone signal.

61. A method of communicating as recited in claim 60, wherein the step of generating said telephone signal comprises generating a voice signal.

62. A method of communicating as recited in claim 60, wherein the step of generating said telephone signal comprises generating a telephonic fax signal.

63. A method of communicating as recited in claim 60, wherein the step of generating said telephone signal comprises generating a telephonic data modem signal.

64. A method of communicating as recited in claim 59, wherein the step of generating said analog signal comprises generating a video signal.

65. A method of communicating as recited in claim 59, wherein the step of generating said analog signal comprises generating an audio signal.

66. A method of communicating as recited in claim 44, the step of transmitting said at least one first upstream modulated carrier signal wirelessly comprises transmitting said at least one first upstream modulated carrier signal wirelessly from each one of a plurality of subscriber access interface devices.

67. A method of communicating as recited in claim 66, the step of transmitting said at least one first upstream modulated carrier signal wirelessly from each one of said plurality of subscriber access interface devices further comprising the step of arbitrating for access to said network access interface device from said plurality of subscriber access interface devices.

68. A method of communicating as recited in claim 44, the steps of modulating and demodulating said upstream baseband signal onto at least one first upstream radio frequency carrier using a direct sequence spread spectrum process.

69. A method of communicating as recited in claim 44, the steps of modulating and demodulating said upstream baseband signal onto at least one first upstream radio frequency carrier using a frequency hopping spread spectrum process.

70. A method of communicating as recited in claim 44, the steps of modulating and demodulating said upstream baseband signal onto at least one upstream wireless radio frequency carrier using a vector modulation process.

71. A method of communicating as recited in claim 69, the steps of modulating and demodulating said upstream baseband signal onto at least one upstream wireless radio frequency carrier using a quadrature phase shift keying process.

72. A method Of communicating as recited in claim 69, the steps of modulating and demodulating said upstream baseband signal onto at least one upstream wireless radio frequency carrier using a bi-phase shift keying process.

73. A method of communicating as recited in claim 44, the steps of modulating and demodulating said upstream baseband signal onto at least one upstream wireless radio frequency carrier using an IEEE 802.11 compliant process.

74. A method of communicating as recited in claim 44, the steps of modulating and demodulating said upstream baseband signal onto at least one upstream wireless radio frequency carrier using a HiperLAN2 compliant process.

75. A method of communicating as recited in claim 44 and further comprising the steps of:

generating a polling signal at said network access interface device, receiving said polling signal at a subscriber access interface device, responding to said polling signal by generating a response upstream baseband signal, transmitting said response upstream baseband signal, and receiving said response upstream baseband signal in said network access interface device.

76. A method of communicating as recited in claim 75 and further comprising the step of forwarding said response upstream baseband signal to a headend on said linear broadband network.

77. A method of communicating as recited in claim 75 and further comprising the step of storing said response upstream baseband signal for retrieval of said response upstream baseband signal upon request.

78. A method of communicating as recited in claim 44, the step of generating an upstream baseband signal further comprising the steps of generating a communication signal in each one of a plurality of said client devices, converting each said communication signal into respective ones of said upstream baseband signals, time division multiplexing each said respective ones of said upstream baseband signals in a subscriber access interface device to produce a multiplexed upstream baseband signal and the step of modulating further comprising the step of modulating said multiplexed baseband signal onto said at least one first upstream radio frequency carrier.

79. A method of communicating as recited in claim 78, wherein the step of converting said communication signal further comprises the step of coupling said upstream baseband signal to said subscriber access interface through a wired connection.

80. A method of communicating as recited in claim 78, wherein the step of converting said communication signal further comprises the step of coupling said upstream baseband signal to said subscriber access interface device through a wireless connection.

81. A method of communicating as recited in claim 78, each said upstream baseband signal comprising a series of upstream data packets, the method further comprising the steps of prioritizing a launch of each said upstream data packet onto said multiplexed upstream baseband signal to control latency of each said upstream data packet.

82. A method of communicating as recited in claim 81 and further comprising the steps of interpreting a header of each upstream data packet, assigning a priority to each upstream data packet, producing an assigned priority for each upstream data packet, and multiplexing each upstream data packet according to said assigned priority.

83. A method of communicating as recited in claim 81 and further comprising the steps of assigning a priority to each upstream data packet based upon a source port configuration, producing an assigned priority for each upstream data packet, and multiplexing each upstream data packet according to said assigned priority.

84. A method of communicating as recited in claim 44 and further comprising the step of:
controlling a timing of the step of receiving said first upstream modulated carrier signal.

85. A method of communicating as recited in claim 44 and further comprising the step of filtering a spectral range of all of said at least one upstream modulated carrier signal.

86. A method of communicating as recited in claim 44 and further comprising the step of establishing a communications link with an alternate network access interface device in the event of a communication link degradation below a predetermined threshold with said network access interface device.

87. A method of communicating bi-directional information as recited in claim 44 the step of transmitting said second downstream baseband signal further comprising the step of routing said at least one second downstream baseband signal to a plurality of client devices.

88. A method of communicating bi-directional information as recited in claim 44 wherein said step of transmitting said at least one first upstream modulated carrier and said step of transmitting said at least one second downstream modulated carrier uses a full-duplex process.

89. A method of communicating bi-directional information as recited in claim 44 wherein said step of transmitting said at least one first upstream modulated carrier and said step of transmitting said at least one second downstream modulated carrier uses a half-duplex process.

90. A system for wirelessly communicating without a wired subscriber drop between a client device and a linear broadband network having substantially linear and broadband frequency characteristics comprising:
means for generating an upstream baseband signal,
means for modulating said upstream baseband signal to produce at least one first upstream modulated carrier signal,
means for transmitting said at least one first upstream modulated carrier signal wirelessly from said client device located at a subscriber's premises, to a network interface device, located proximately to said linear broadband network, thereby eliminating said wired subscriber drop,
means for receiving said at least one first upstream modulated carrier signal at a network access interface device coupled to said linear broadband network,
means for demodulating said at least one first upstream modulated carrier signal to produce an upstream demodulated baseband signal, and
means for modulating said upstream demodulated baseband signal onto at least one second upstream radio frequency carrier to produce at least one second upstream modulated carrier signal having a signal format compatible with said linear broadband network.

91. A system for upstream wireless communication comprising: a linear broadband network located remotely from a subscriber's premises having substantially linear and broadband frequency characteristics, a first upstream modulator that modulates at least one upstream baseband signal received from a client device located at said subscriber's premises to eliminate a wired subscriber drop, said at least one upstream baseband signal being modulated onto at least one upstream wireless radio frequency carrier to produce a first upstream modulated carrier signal, an upstream transmitter that wirelessly transmits said at least one first upstream modulated carrier signal, an upstream receiver that receives said at least one first upstream modulated carrier signal, an upstream demodulator that demodulates said at least one first upstream modulated carrier signal to generate at least one upstream demodulated baseband signal, a second upstream modulator that modulates said at least one demodulated upstream baseband signal onto at least one upstream linear broadband network radio frequency carrier for transmission onto said linear broadband network.

92. A system for communicating as recited in claim 91 and further comprising a plurality of client devices, each said plurality of client devices generating a one of said at least one upstream baseband signals.

93. A system for communicating as recited in claim 92, and further comprising a multiplexer that multiplexes said plurality of said at least one upstream baseband signals to produce a multiplexed upstream baseband signal.

94. A system for communicating as recited in claim 93, said upstream baseband signal comprising a plurality of upstream data packets, the system further comprising a prioritization device that assigns a priority to each upstream data packet, said priority informing said multiplexer of an appropriate order in which said multiplexer selects each upstream data packet.

95. A system for communicating as recited in claim 91, wherein said client device is a telephone.

96. A system for communicating as recited in claim 91, wherein said client device is a video device.

97. A system for communicating as recited in claim 91, wherein said client device is a computer.

98. A system for communicating as recited in claim 91, wherein said client device is an audio device.

99. A system for communicating as recited in claim 91 and further comprising an arbitrator that controls an order in which said upstream transmitter transmits said at least one first upstream modulated carrier signal.

100. A system for communicating as recited in claim 91 and further comprising an arbitrator that controls an order in which said receiver receives said at least one first upstream modulated carrier signal.

101. A system for communicating as recited in claim 91, and further comprising a forward error correction encoder and a forward error correction decoder.

102. A system for communicating as recited in claim 91 wherein said upstream baseband signal is transmitted over a wired connection.

103. A system for communicating as recited in claim 91 wherein said upstream baseband signal is modulated onto a local upstream carrier and transmitted wirelessly.

104. A system for communicating as recited in claim 91, wherein said first upstream modulator and said upstream transmitter are integral with said client device.

105. A system for communicating as recited in claim 91, wherein said first upstream modulator and said upstream transmitter comprise a peripheral device to said client device.

106. A system for wireless, bi-directional communication between a client device located at a subscriber's premises and a bi-directional linear broadband network located remotely from said subscriber's premises to eliminate a wired subscriber drop, said linear broadband network having substantially linear and broadband frequency characteristics comprising:

a first upstream modulator that modulates at least one upstream baseband signal received from said client device, said at least one upstream baseband signal being modulated onto at least one upstream wireless radio frequency carrier to produce at least one first upstream modulated carrier signal, an upstream transmitter, located proximately to said subscriber's premises, that wirelessly transmits said at least one first upstream modulated carrier signal from said subscriber's premises to said bi-directional linear broadband network, thereby eliminating said wired subscriber drop, an upstream receiver, located proximately to said linear broadband network, and that receives said at least one first upstream modulated carrier signal, an upstream demodulator that demodulates said at least one first upstream modulated carrier signal to generate at least one upstream demodulated baseband signal, a second upstream modulator that modulates said at least one demodulated upstream baseband signal onto at least one upstream linear broadband network radio frequency carrier for transmission onto said linear broadband network, a first downstream receiver that receives at least one first downstream modulated carrier signal from said linear broadband network, a first downstream demodulator that demodulates said at least one first downstream modulated carrier signal to produce a first downstream baseband signal, a downstream modulator that modulates said first downstream baseband signal onto a downstream wireless radio frequency carrier to produce a second downstream modulated carrier signal, a downstream transmitter, located proximately to said linear broadband network, that transmits said downstream modulated carrier signal, thereby eliminating said subscriber drop, a second downstream receiver, located proximately to said subscriber's premises, that receives said downstream modulated carrier signal, a second downstream demodulator that demodulates said downstream modulated carrier signal to produce a second downstream baseband signal for delivery to said client device.

107. A system for communicating as recited in claim 106 and further comprising a plurality of client devices, each said plurality of client devices generating one of said at least one upstream baseband signals.

108. A system for communicating as recited in claim 107, and further comprising a multiplexer that multiplexes said plurality of said at least one upstream baseband signals to produce a multiplexed upstream baseband signal.

109. A system for communicating as recited in claim 106, wherein said client device is a telephone.

110. A system for communicating as recited in claim 106, wherein said client device is a video device.

111. A system for communicating as recited in claim 106, wherein said client device is a computer.

112. A system for communicating as recited in claim 106, wherein said client device is an audio device.

113. A system for communicating as recited in claim 106 and further comprising an arbitrator that controls an order in which said upstream transmitter transmits said at least one first upstream modulated carrier signal.

114. A system for communicating as recited in claim 106 and further comprising an arbitrator that controls an order in which said upstream receiver receives said at least one upstream modulate carrier signal.

115. A system for communicating as recited in claim 106, and further comprising a forward error correction encoder and a forward error correction decoder.

116. A system for communicating as recited in claim 108, said upstream baseband signal comprising a plurality of upstream data packets, the system further comprising a prioritization device that assigns a priority to each upstream data packet, said priority informing said multiplexer of an appropriate order in which said multiplexer selects each upstream data packet.

117. A system for communicating as recited in claim 106 wherein said upstream baseband signal is transmitted over a wired connection.

118. A system for communicating as recited in claim 106 wherein said upstream baseband signal is modulated onto a local upstream carrier and transmitted wirelessly.

119. A system for communicating as recited in claim 106, wherein said first upstream modulator and said upstream transmitter are integral with said client device.

120. A system for communicating as recited in claim 106, wherein said first upstream modulator and said upstream transmitter comprise a peripheral device to said client device.

121. An apparatus for wirelessly coupling a subscriber to a remotely located linear broadband network to eliminate a wired subscriber drop, said linear broadband network having substantially linear and broadband frequency characteristics comprising:

an upstream receiver, located proximately to said linear broadband network, that wirelessly receives at least one first upstream modulated carrier signal from said subscriber, thereby eliminating said wired subscriber drop, an upstream demodulator that demodulates said at least one upstream modulated carrier signal to produce at least one demodulated upstream baseband signal, an upstream modulator that modulates said at least one demodulated upstream baseband signal onto at least one upstream linear broadband network radio frequency carrier to produce at least one second upstream modulated carrier signal for transmission on the linear broadband network, and an upstream transmitter that transmits said at least one second upstream modulated carrier signal onto the linear broadband network.

122. An apparatus for coupling as recited in claim 121 and further comprising an arbitrator for controlling a timing of receipt of said at least one upstream radio frequency carrier from a plurality of client devices.

123. An apparatus for coupling as recited in claim 121 and further comprising a polling device for acquiring information from a client device.

124. A system for wireless upstream communication from a subscriber location to a linear broadband network to eliminate a wired subscriber drop between said subscriber location and said linear broadband network comprising:

said linear broadband network having substantially linear and broadband frequency characteristics, a subscriber access interface device that receives an upstream baseband signal from a client device located at said subscriber location, modulates said upstream baseband signal onto at least one upstream wireless radio frequency carrier to produce at least one first upstream modulated carrier signal, and wirelessly transmits said at least one first upstream wireless modulated carrier signal from said subscriber location to said linear broadband network, a network access interface device, coupled to said linear broadband network, that receives said at least one first upstream modulated carrier signal, demodulates said at least one first upstream modulated carrier signal to produce at least one demodulated upstream baseband signal, modulates said at least one demodulated upstream baseband signal onto at least one upstream linear broadband network radio frequency carrier having a format compatible with said linear broadband network to produce at least one second upstream modulated carrier signal, and transmits said at least one second upstream modulated carrier signal onto said linear broadband network.

125. A system for upstream communication as recited in claim 124 and further comprising a first client device coupled to said subscriber access interface device, wherein said first client device interfaces to a local area network that is connected to a plurality of second client devices.

126. A system for upstream communication as recited in claim 124 and further comprising an alternate network access interface device wherein said subscriber access interface device communicates with said network access interface device until a communication link with said network access interface device falls below a predetermined threshold and upon falling below said predetermined threshold, said subscriber access interface device establishes an alternate communication link with said alternate network access interface device.

127. A system for upstream communication as recited in claim 124 and further comprising an alternate network access interface device wherein said subscriber access interface device communicates with said network access interface device and said alternate network access interface device according to the existence of an adequate communication link.

128. A system for wireless upstream communication from a subscriber location to a linear broadband network to eliminate a wired subscriber drop between said subscriber location and said linear broadband network comprising:

said linear broadband network having substantially linear and broadband frequency characteristics, a subscriber access interface device that receives an upstream baseband signal, modulates said upstream baseband signal, and wirelessly transmits said modulated upstream baseband signal to said linear broadband network, a network access interface device, coupled to said linear broadband network, that receives said modulated upstream baseband signal, demodulates said modulated upstream baseband signal to produce at least one demodulated upstream baseband signal, modulates said at least one demodulated upstream baseband signal onto at least one upstream linear broadband network radio frequency carrier having a format compatible with said linear broadband network to produce at least one second upstream modulated carrier signal, and transmits said at least one second upstream modulated carrier signal onto said linear broadband network.

129. A method of wirelessly communicating information without a wired subscriber drop from a client device to a linear broadband network, said linear broadband network having substantially linear and broadband frequency characteristics comprising: generating an upstream baseband signal, modulating the upstream baseband signal onto an upstream wireless radio frequency carrier to generate a first upstream modulated carrier signal, transmitting said first upstream modulated carrier signal wirelessly from said client device to a network access interface to eliminate said wired subscriber drop, receiving said first upstream modulated carrier signal at said network access interface device, said network access interface coupled to the linear broadband network, demodulating said first upstream modulated carrier signal to produce an upstream demodulated baseband signal, and modulating said upstream demodulated baseband signal onto an upstream linear broadband radio frequency carrier to produce a second upstream modulated carrier signal that is compatible with said linear broadband network.

* * * * *

UNITED STATES PATENT AND TRADEMARK OFFICE
CERTIFICATE OF CORRECTION

| | |
|---|---|
| PATENT NO. | : 6,377,782 B1 |
| APPLICATION NO. | : 09/505107 |
| DATED | : April 23, 2002 |
| INVENTOR(S) | : Donald M. Bishop, George R. J. Green and Archie R. Shyu |

It is certified that error appears in the above-identified patent and that said Letters Patent is hereby corrected as shown below:

Col. 30, line 43 Claim 71, cancel the text "claim 69" and enter the text --claim 70--.
Col. 30, line 47 Claim 72, cancel the text "claim 69" and enter the text --claim 70--.

Signed and Sealed this

Twenty-fourth Day of June, 2008

JON W. DUDAS
*Director of the United States Patent and Trademark Office*